United States Patent
Caceres et al.

(10) Patent No.: US 11,676,126 B1
(45) Date of Patent: Jun. 13, 2023

(54) ACCOUNT OPEN INTERFACES

(71) Applicant: Wells Fargo Bank, N.A., San Francisco, CA (US)

(72) Inventors: Jennifer J. Caceres, San Bruno, CA (US); Lila Fakhraie, Belmont, CA (US); Jennifer Greene, Novato, CA (US); Christopher J. Hirth, Bell Canyon, CA (US); Ashish B. Kurani, Hillsborough, CA (US); Andrea Renee Leighton, San Francisco, CA (US); Margot Lockwood-Stein, Palo Alto, CA (US); Kumaran Perumal, San Francisco, CA (US); Benjamin Soccorsy, Larkspur, CA (US); Ronald H. Yang, El Cerrito, CA (US); Young M. Yang, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 491 days.

(21) Appl. No.: 16/405,432

(22) Filed: May 7, 2019

Related U.S. Application Data

(63) Continuation-in-part of application No. 16/215,548, filed on Dec. 10, 2018, now Pat. No. 11,106,515.
(Continued)

(51) Int. Cl.
*G06Q 20/32* (2012.01)
*G06Q 20/10* (2012.01)

(52) U.S. Cl.
CPC ....... *G06Q 20/3223* (2013.01); *G06Q 20/108* (2013.01)

(58) Field of Classification Search
CPC ...... G06Q 20/10; G06Q 20/223; G06Q 20/02; G06Q 20/0855; G06Q 20/108; G06Q 20/3223; G06F 9/547
See application file for complete search history.

(56) References Cited

U.S. PATENT DOCUMENTS 6,347,306 B1  2/2002  Swart
6,721,776 B1  4/2004  Erickson et al.
(Continued)

FOREIGN PATENT DOCUMENTS

WO  WO-2010/085370       7/2010
WO  WO-2017/160877 A1   9/2017
WO  WO-2017/181185 A1   10/2017

OTHER PUBLICATIONS

Zachariadis, M., et al. The API economy and digital transformation in financial services: The case of open banking. SWIFT Institute Working Paper No. 2016-001. Jun. 15, 2017. (Year: 2017).*
(Continued)

*Primary Examiner* — Bennett M Sigmond
*Assistant Examiner* — Bolko M Hamerski
(74) *Attorney, Agent, or Firm* — Foley & Lardner LLP

(57) ABSTRACT

A computing system may include a network circuit configured to communicate with a third party computing device via a network, one or more interface elements (e.g., application programming interfaces and/or software development kits) providing account open functionality, and an account open circuit configured to: accept, via the interface elements, a set of user data and an account open request for opening a new account with the provider, where the set of user data is received from a user computing device of a user via a third party website or application; establish the new account by generating a set of account data associated with the new account without directing the user to the operating environment of a website or application of the provider; and transmit the set of account data to the third party computing device for use by the third party computing device in a transaction with the user.

5 Claims, 14 Drawing Sheets

Related U.S. Application Data

(60) Provisional application No. 62/668,632, filed on May 8, 2018, provisional application No. 62/611,288, filed on Dec. 28, 2017.

(56) References Cited

U.S. PATENT DOCUMENTS

| | | |
|---|---|---|
| 7,249,097 B2 | 7/2007 | Hutchison et al. |
| 7,356,506 B2 | 4/2008 | Watson et al. |
| 7,444,676 B1 | 10/2008 | Asghari-Kamrani et al. |
| 7,523,068 B2 | 4/2009 | Britney et al. |
| 7,536,326 B2 | 5/2009 | Tyson-Quah |
| 7,610,233 B1 | 10/2009 | Leong et al. |
| 7,725,875 B2 | 5/2010 | Waldrep |
| 7,729,994 B2 | 6/2010 | Gupta et al. |
| 7,831,521 B1 | 11/2010 | Ball et al. |
| 7,870,078 B2 | 1/2011 | Clark et al. |
| 7,890,393 B2 | 2/2011 | Talbert et al. |
| 8,301,500 B2 | 10/2012 | Pharris |
| 8,352,323 B2 | 1/2013 | Fisher |
| 8,352,370 B1 | 1/2013 | White et al. |
| 8,412,625 B2 | 4/2013 | Pilo' |
| 8,452,708 B1 | 5/2013 | Birenbaum et al. |
| 8,453,925 B2 | 6/2013 | Fisher et al. |
| 8,527,408 B2 | 9/2013 | Campbell et al. |
| 8,606,670 B2 | 12/2013 | Patton |
| 8,745,194 B2 | 6/2014 | Uribe-Etxebarria Jimenez |
| 8,818,870 B2 | 8/2014 | Fisher |
| 8,838,503 B2 | 9/2014 | Pelegero |
| 9,135,618 B1 | 9/2015 | Dorsey et al. |
| 9,219,736 B1 | 12/2015 | Lewis et al. |
| 9,225,707 B1 | 12/2015 | De Sousa et al. |
| 9,378,356 B2 | 6/2016 | Rockwell |
| 9,471,913 B1 | 10/2016 | Kaptcan et al. |
| 9,495,699 B2 | 11/2016 | Mangaru et al. |
| 9,525,690 B2 | 12/2016 | Burgess et al. |
| 9,542,673 B2 | 1/2017 | Tanner et al. |
| 9,589,268 B2 | 3/2017 | Hammad |
| 9,633,341 B2 | 4/2017 | Kim et al. |
| 9,646,297 B2 | 5/2017 | Van Den Broeck et al. |
| 9,665,854 B1 | 5/2017 | Burger et al. |
| 9,705,999 B1 | 7/2017 | Lewis et al. |
| 9,779,436 B2 | 10/2017 | Bui |
| 9,830,606 B2 | 11/2017 | Boncimino |
| 9,846,872 B2 | 12/2017 | Hogg et al. |
| 9,876,803 B2 | 1/2018 | Miu et al. |
| 9,892,386 B2 | 2/2018 | Liberty |
| 9,922,381 B2 | 3/2018 | Isaacson et al. |
| 9,990,621 B1 | 6/2018 | Ng et al. |
| 10,055,740 B2 | 8/2018 | Hanson et al. |
| 10,062,072 B2 | 8/2018 | Davis et al. |
| 10,062,073 B2 | 8/2018 | Baldie |
| 10,068,295 B1 | 9/2018 | Allen |
| 10,073,953 B2 | 9/2018 | Xing |
| 10,083,427 B2 | 9/2018 | Cummins et al. |
| 10,089,617 B2 | 10/2018 | Royyuru et al. |
| 10,121,129 B2 | 11/2018 | Kalgi |
| 10,121,133 B2 | 11/2018 | Nelms et al. |
| 10,127,528 B2 | 11/2018 | Solis |
| 10,127,549 B2 | 11/2018 | Keresman et al. |
| 10,148,659 B2 | 12/2018 | Nandakumar |
| 10,157,375 B2 | 12/2018 | Balasubramanian et al. |
| 10,163,086 B2 | 12/2018 | Keresman et al. |
| 10,181,119 B2 | 1/2019 | Cyr et al. |
| 10,181,162 B2 | 1/2019 | Drury et al. |
| 10,185,954 B2 | 1/2019 | Mizhen et al. |
| 10,210,345 B2 | 2/2019 | Beye et al. |
| 10,210,514 B2 | 2/2019 | Musser et al. |
| 10,354,240 B2 | 7/2019 | Purves et al. |
| 10,362,010 B2 | 7/2019 | Sharp et al. |
| 10,467,689 B2 * | 11/2019 | Chen ................. G06Q 20/22 |
| 10,510,082 B1 | 12/2019 | Zimmerman et al. |
| 10,621,658 B1 | 4/2020 | Sahni et al. |
| 10,708,054 B2 | 7/2020 | Donaldson et al. |
| 11,044,092 B1 | 6/2021 | Freeling et al. |
| 11,044,246 B1 | 6/2021 | Freeling et al. |
| 11,050,565 B1 | 6/2021 | Freeling et al. |
| 11,429,971 B1 | 8/2022 | Ouellette et al. |
| 2002/0181710 A1 | 12/2002 | Adam et al. |
| 2004/0177047 A1 | 9/2004 | Graves et al. |
| 2005/0262026 A1 | 11/2005 | Watkins |
| 2006/0059569 A1 | 3/2006 | Dasgupta et al. |
| 2006/0129896 A1 | 6/2006 | Rohn |
| 2006/0277128 A1 | 12/2006 | Anandarao et al. |
| 2007/0288377 A1 | 12/2007 | Shaked |
| 2008/0052183 A1 | 2/2008 | Hobson et al. |
| 2008/0086417 A1 | 4/2008 | Bykov et al. |
| 2008/0167944 A1 | 7/2008 | Keithley et al. |
| 2008/0288405 A1 | 11/2008 | John |
| 2008/0301022 A1 | 12/2008 | Patel et al. |
| 2009/0043667 A1 * | 2/2009 | DeYoe ................. G06Q 40/00 705/26.1 |
| 2009/0076934 A1 | 3/2009 | Shahbazi et al. |
| 2009/0089190 A1 | 4/2009 | Girulat, Jr. |
| 2009/0249448 A1 | 10/2009 | Choi et al. |
| 2009/0320106 A1 | 12/2009 | Jones et al. |
| 2010/0094719 A1 | 4/2010 | Sines et al. |
| 2010/0169223 A1 | 7/2010 | Yuan |
| 2011/0137804 A1 | 6/2011 | Peterson |
| 2011/0270751 A1 | 11/2011 | Csinger et al. |
| 2012/0198535 A1 | 8/2012 | Oberheide et al. |
| 2013/0013512 A1 | 1/2013 | Cloud et al. |
| 2013/0103578 A1 | 4/2013 | Mallean et al. |
| 2013/0117832 A1 | 5/2013 | Gandhi et al. |
| 2013/0179957 A1 | 7/2013 | Takata et al. |
| 2013/0198066 A1 | 8/2013 | Wall et al. |
| 2013/0339231 A1 | 12/2013 | Chaitanya |
| 2013/0346302 A1 | 12/2013 | Purves et al. |
| 2014/0129435 A1 | 5/2014 | Pardo et al. |
| 2014/0223578 A1 | 8/2014 | Ross |
| 2014/0256425 A1 * | 9/2014 | Flaherty ................. A63F 13/70 463/29 |
| 2014/0258046 A1 | 9/2014 | Wendling et al. |
| 2014/0258136 A1 | 9/2014 | Ellis |
| 2014/0279546 A1 | 9/2014 | Poole et al. |
| 2014/0324690 A1 | 10/2014 | Allen et al. |
| 2014/0359722 A1 | 12/2014 | Schultz et al. |
| 2015/0019423 A1 | 1/2015 | Dowling et al. |
| 2015/0026061 A1 | 1/2015 | Siegel et al. |
| 2015/0039452 A1 | 2/2015 | Barve et al. |
| 2015/0058931 A1 | 2/2015 | Miu et al. |
| 2015/0074407 A1 | 3/2015 | Palmeri et al. |
| 2015/0089409 A1 | 3/2015 | Asseily et al. |
| 2015/0089615 A1 | 3/2015 | Krawczyk et al. |
| 2015/0121462 A1 | 4/2015 | Courage et al. |
| 2015/0154588 A1 | 6/2015 | Purves et al. |
| 2015/0161608 A1 | 6/2015 | Gilbert et al. |
| 2015/0188900 A1 | 7/2015 | Charbonneau et al. |
| 2015/0188915 A1 | 7/2015 | Li |
| 2015/0242834 A1 | 8/2015 | Goldsmith et al. |
| 2015/0242949 A1 | 8/2015 | Phillips, IV |
| 2015/0278811 A1 | 10/2015 | Lalchandani et al. |
| 2015/0310497 A1 | 10/2015 | Valin et al. |
| 2015/0363581 A1 | 12/2015 | Ranadive et al. |
| 2015/0371226 A1 | 12/2015 | Hurley et al. |
| 2016/0005113 A1 | 1/2016 | Mendez et al. |
| 2016/0012465 A1 | 1/2016 | Sharp |
| 2016/0132877 A1 | 5/2016 | Carrott |
| 2016/0189145 A1 | 6/2016 | William |
| 2016/0267449 A1 | 9/2016 | Forzley |
| 2017/0004719 A1 | 1/2017 | Laud et al. |
| 2017/0024716 A1 | 1/2017 | Jiam et al. |
| 2017/0070500 A1 * | 3/2017 | Hockey ................. H04L 9/3228 |
| 2017/0076274 A1 | 3/2017 | Royyuru et al. |
| 2017/0126649 A1 | 5/2017 | Votaw et al. |
| 2017/0180960 A1 | 6/2017 | Drake |
| 2017/0286958 A1 | 10/2017 | Herman |
| 2017/0289140 A1 | 10/2017 | Cai et al. |
| 2017/0308880 A1 | 10/2017 | Phillips et al. |
| 2017/0310771 A1 | 10/2017 | Lewis et al. |
| 2017/0351514 A1 | 12/2017 | Chou et al. |
| 2017/0372275 A1 | 12/2017 | Sigmund |
| 2018/0025333 A1 | 1/2018 | Cunningham |
| 2018/0060965 A1 | 3/2018 | Kumar |

(56) References Cited

U.S. PATENT DOCUMENTS

| | | |
|---|---|---|
| 2018/0068312 A1 | 3/2018 | Kim et al. |
| 2018/0121896 A1 | 5/2018 | Potadar |
| 2018/0130051 A1 | 5/2018 | Matthews et al. |
| 2018/0139109 A1* | 5/2018 | Zuerner ............ H04L 41/40 |
| 2018/0150823 A1 | 5/2018 | Omojola et al. |
| 2018/0150826 A1 | 5/2018 | Schwartz et al. |
| 2018/0189778 A1 | 7/2018 | Grassadonia et al. |
| 2018/0198845 A1 | 7/2018 | Kulp et al. |
| 2018/0225789 A1 | 8/2018 | Cook |
| 2018/0240095 A1 | 8/2018 | Buckley et al. |
| 2018/0247654 A1 | 8/2018 | Bhaya et al. |
| 2018/0253727 A1 | 9/2018 | Ortiz et al. |
| 2018/0267847 A1 | 9/2018 | Smith et al. |
| 2018/0276053 A1 | 9/2018 | Kesavan et al. |
| 2018/0315024 A1 | 11/2018 | Rauch et al. |
| 2018/0349891 A1 | 12/2018 | Putre et al. |
| 2019/0005467 A1 | 1/2019 | Varagani et al. |
| 2019/0012646 A1 | 1/2019 | Seidl et al. |
| 2019/0034393 A1 | 1/2019 | Rose |
| 2019/0043138 A1 | 2/2019 | Blake et al. |
| 2019/0050845 A1 | 2/2019 | Deshmukh et al. |
| 2019/0058707 A1 | 2/2019 | Chung et al. |
| 2019/0066090 A1 | 2/2019 | Mei et al. |
| 2019/0087809 A1* | 3/2019 | Bloy ............ G06Q 20/409 |
| 2019/0087894 A1 | 3/2019 | Eloy et al. |
| 2019/0096005 A1 | 3/2019 | Drury et al. |
| 2019/0205851 A1 | 7/2019 | Sinha et al. |
| 2019/0244263 A1 | 8/2019 | Nelson et al. |
| 2019/0281051 A1 | 9/2019 | Burmester et al. |
| 2019/0303910 A1 | 10/2019 | Asbe et al. |
| 2019/0312746 A1 | 10/2019 | Myers et al. |
| 2019/0318122 A1 | 10/2019 | Hockey et al. |
| 2020/0053061 A1* | 2/2020 | Cambou ............ H04L 63/0457 |
| 2020/0092108 A1 | 3/2020 | Lyu |
| 2021/0224767 A1 | 7/2021 | Devan et al. |

OTHER PUBLICATIONS

Byambajav, Dolgorsuren; "Secure NFC enabled mobile phone payments using elliptic curve cryptography"; California State University, Aug. 2011. (Year: 2011).

Multibiometric Techniques and standards Activities, Rick Lazarick (Year: 2005).

Using Haptic Interfaces for User Verification in Virtual Environments Orozco (Year: 2008).

Wells Fargo Bank NA Granted Patent for Identity Verification Services with Identity Score Through External Entities Via Application Programming Interface Global IP News. Banking Patent News [New Delhi] Apr. 14, 2020. (Year: 2020).

Subhashree Samal and Swarna Prabha Jena, "Research on the Development of a New Shop Application Using Android," Mar. 2014, International Journal of Advance Computer Research, vol. 4, No. 1 Issue Mar. 14, 2014, pp. 236-241 (Year: 2014).

V. Toubiana, V. Verdot, G. Burnside and E. Joubert, "R2M: A Reputation Model for Mashups," 2010 7th IEEE Consumer Communications and Networking Conference, 2010, pp. 1-6, doi: 10.1109/CCNC.2010.5421609. (Year: 2010).

Bonneau, Joseph and Soren Preibusch. "The Password Thicket: Technical and Market Failures in Human Authentication on the Web. "The Ninth Workshop on the Economics of Information Security. Weis. 2010. (Year: 2010).

* cited by examiner

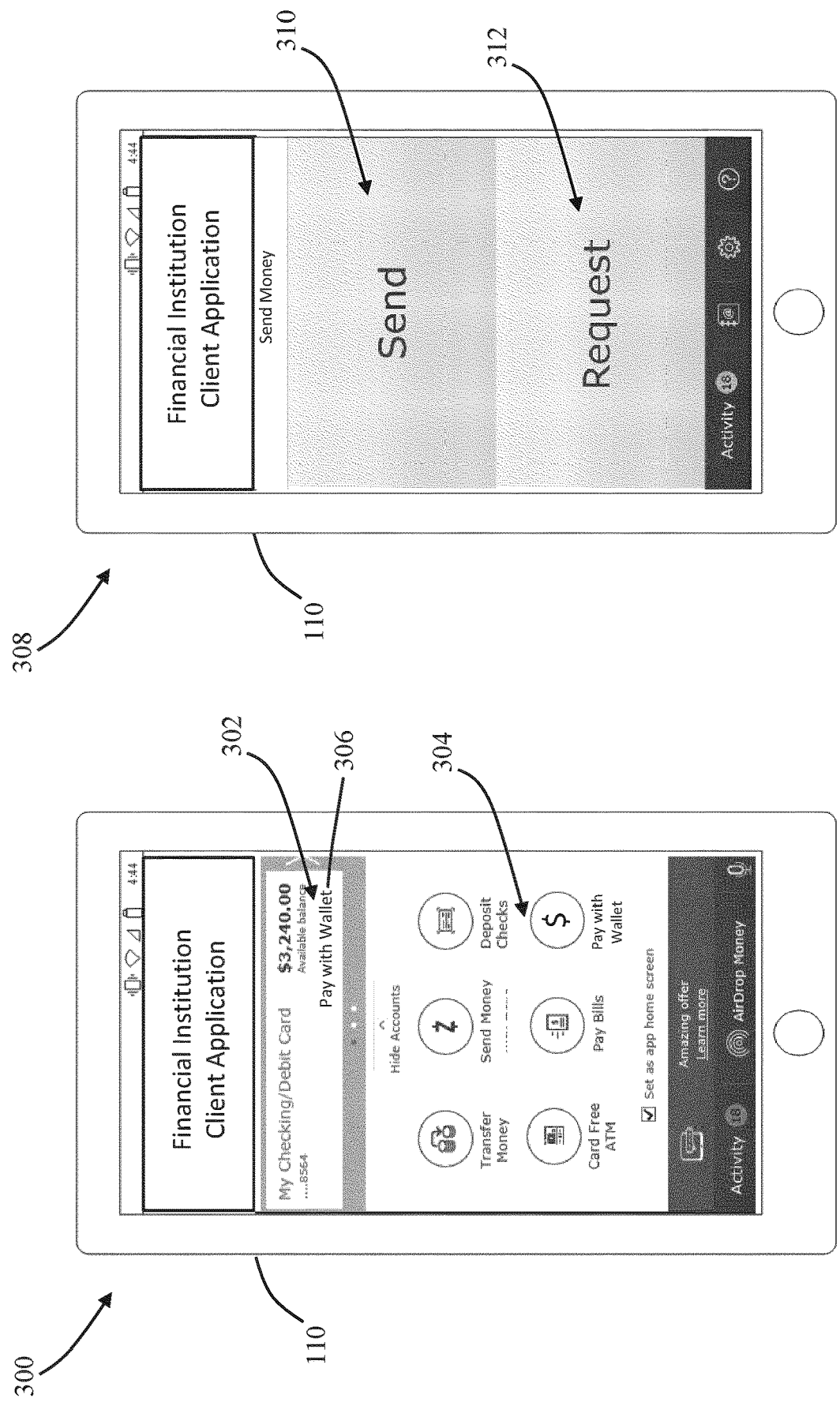

ACCOUNT OPEN INTERFACES

CROSS-REFERENCE TO RELATED APPLICATIONS

This application claims the benefit of and priority to U.S. Provisional Patent Application No. 62/668,632, filed May 8, 2018, entitled "Account Open Interfaces," and is a continuation-in-part of U.S. patent application Ser. No. 16/215,548, filed Dec. 10, 2018, entitled "Systems and Methods for Multi-Platform Product Integration," which claims priority to U.S. Provisional Patent Application No. 62/611,288, filed Dec. 28, 2017, entitled "Systems and Methods for Multi-Platform Product Integration," each of which is hereby incorporated by reference in its entirety.

TECHNICAL FIELD

The present disclosure relates to systems and methods for multi-platform service integration. More particularly, the present disclosure is directed to a client application including a plurality of functionalities that may also be accessed via external applications. The present disclosure is additionally directed to providing account-open functionality via third-party platforms.

BACKGROUND

Today, purchases are accomplished in a variety of ways from conventional cash or currency to now electronic-based transactions. Certain forms of such electronic-based transactions may be more beneficial than others depending on the circumstances of a user. For example, when with another individual, the user may wish to make a person-to-person payment to that individual. When with a merchant, the user may wish to conduct a mobile wallet transaction. Thus, the user's preferences change based on the circumstances.

Electronic funds transfers generally require a source account with the funds to be transferred, and a destination account for receiving the funds. These accounts are conventionally set up in advance of a transaction. For example, an online shopper typically already has opened a credit or debit account (the source account) before making purchases with an online merchant. If the shopper does not already have a source account when it is time to pay for selected items (e.g., during "check out"), the shopper may visit a website or branch of a third party to set up an account, and subsequently return to the online merchant to complete the purchase. The inconvenience of such a process may deter shoppers, who may defer making purchases and sometimes forego a purchase altogether as a result of the delay and inconvenience of the added steps, and result in lost opportunities for both the merchant as well as for the third party.

SUMMARY

One embodiment of the invention relates to a system that includes a network circuit configured to communicate data over a network, an accounts database configured to store information pertaining to accounts associated with a plurality of customers, and a plurality of application programming interfaces (APIs). The system also includes an integration circuit configured to receive a plurality of indications from different third parties of third party preferences to integrate different ones of the functionalities into different third party services. The integration circuit is further configured to select different subsets of the plurality of APIs for the different third parties based on functionalities identified via the indications. The integration circuit is further configured to update access permissions associated with the different subsets of the plurality of APIs to facilitate sharing of information associated with the functionalities with the third party systems. The integration circuit is further configured to provide, via a first selected subset of the plurality of APIs, information associated with a first functionality to an external device to facilitate access to the first functionality via a first third party service.

Another embodiment relates to a method. The method includes receiving, by a system associated with a financial institution, a plurality of indications from different third parties of third party preferences to integrate different products offered by the financial institution into different third party services. The method also includes selecting, by the system, different subsets of a plurality application programming interfaces (APIs) for the different third parties based on the products identified via the indications. The method also includes updating, by the system, access permissions associated with the different subsets of the plurality of APIs to facilitate sharing of information associated with the functionalities with the third party systems. The method also includes providing, by the system, via a first selected subset of the plurality of APIs, information associated with a first product to an external device to facilitate access to the first product via a first third party service.

Another embodiment relates to a mobile device. The mobile device includes a network circuit structured to communicate data to and from a system associated with a financial institution, an input/output device structured to exchange data with a user; a processor, and a memory configured to store program instructions executable by the processor. The instructions include a financial institution client application configured to cause the processor to present, via the input/output device, the user with a multi-function graphical user interface, the multi-function graphical user interface including a mobile wallet input configured to receive a user input to engage in a mobile wallet transaction and a plurality of additional inputs configured to receive user inputs access a plurality of functionalities. The instructions also include a third party client application that is separate from the financial institution client application. The third party client application includes a set of instructions configured to provide the user with access to one of the plurality of functionalities of the financial institution client application. The set of instructions cause the processor to receive a user input to access the one of the plurality of functionalities via the third party client application, transmit, by the network circuit, an application programming interface (API) access request to an external system in response to receiving the user input, the API access request identifying the one of the plurality of functionalities, and receive, by the network circuit, information relating to the functionality from the system to enable access to the functionality via the third party client application.

Another embodiment relates to a system associated with a provider. The system may include a network circuit configured to communicate data with a third party computing device of a third party via a network. The system may additionally include an account open circuit configured to accept an account open request and a set of user data transmitted to the system via the network. The account open request may be for opening a new account with the provider. The set of user data may be received at the third party computing device from a user computing device of a user via a third party website or a third party application. The account open circuit may also be configured to establish the new account by generating a set of account data associated with the new account without directing the user away from the third party website or third party application. The account open circuit may further be configured to transmit the set of account data to the third party computing device for use by the third party computing device in a financial transaction involving the user computing device. In some implementations, the system may also include one or more application programming interfaces (APIs) providing account open functionality. The APIs may be made being accessible to the third party computing device via the system. The account open circuit may be configured to accept the account open request and the set of user data via the APIs. The account open circuit may, alternatively or additionally, be configured to transmit the set of account data to the third party computing device via the APIs.

Another embodiment relates to a method implemented by a system associated with a provider. The method may include making one or more interface elements associated with account open functionality accessible to a third party computing device via a network. The method may also include accepting, via the interface elements, an account open request and a set of user data transmitted to the system over the network, wherein the account open request is for a new account with the provider, wherein the set of user data is received at the third party computing device from a user computing device via a third party website or third party application. The method also may include establishing the new account by generating a set of account data associated with the new account without directing the user away from the third party website or third party application. The method may also include transmitting, via the interface elements, the set of account data to the third party computing device for use by the third party computing device in a financial transaction involving the user computing device. In various implementations, the interface elements may include one or more application programming interfaces (APIs), one or more software development kits (SDKs), or a combination of at least one API and at least one SDK.

Another embodiment relates to a third party computing system. The system may include a network circuit configured to communicate data with a provider system via a network. The third party computing system may also include one or more application programming interfaces (APIs) interface elements providing account open functionality for accounts at a provider associated with the provider system, the interface elements having been acquired via the provider system. The third party computing system may also include a memory having instructions executable by a processor. The instructions may be configured to direct the third party computing system to receive, via a third party website or a third party application, a set of user data from a user computing device of a user. The set of user data may be transmitted by the user computing device to the third party computing system in response to a signal, received at the user computing device via the third party website or third party application, indicating the user has selected to open the new account with the provider. The instructions may also be configured to transmit an account open request and the set of user data to the provider system via the network, wherein the account open request is for opening a new account with a provider associated with the provider system. The instructions may also be configured to receive a set of account data for use in a transaction with the user, the set of account data having been generated by the provider system in establishing the new account, wherein the new account is opened without directing the user away from the third party website or third party application. In some implementations, the account open request may be transmitted to the provider system via the interface elements. In certain implementations, the set of account data may be received from the provider system via the interface elements. In various implementations, the interface elements may include one or more application programming interfaces (APIs), one or more software development kits (SDKs), or a combination of at least one API and at least one SDK.

Another embodiment relates to a mobile computing device. The mobile computing device may include a network circuit configured to communicate data with a third party computing device of a third party via a network. The mobile computing device may also include memory having stored thereon a third party application retrieved from the third party computing device or from a digital application distribution platform. The memory may also include data defining visually perceptible elements presented via the third party application, wherein the visually perceptible elements are associated with the third party. The third party application may be configured to present a first set of one or more pages for allowing the user of the mobile computing device to engage in a transaction with the third party. The first set of pages may include the visually perceptible elements associated with the third party. The third party application may also be configured to present an active link for opening a new account with a provider. The third party and the provider may each be third parties with respect to one another. The third party application may also be configured to, in response a signal indicating activation of the link, and without launching an application of the provider or directing the user to a website of the provider, present a second set of one or more pages for receiving data for opening the new account with the provider. The second set of pages may include the visually perceptible elements.

Other embodiments relate to methods of providing account-open functionality. The method may be implemented by an institution computing system of a provider institution. The account-open functionality may be provided through a service provider computing device of a service provider. The method may comprise accepting an account open request and/or a set of user data. The account open request and/or the set of user data may be received from the service provider computing device. The account open request and/or the set of user data may be transmitted by the service provider computing device to the institution computing system via a telecommunications network. The set of user data may be transmitted by a user computing device to the service provider computing device. The set of user data may be transmitted by the user computing device via a first website of the service provider and/or via a first application of the service provider. The first website and/or the first application may be accessed by a user using the user computing device. The method may comprise establishing a new account for the user of the user computing device. The new account may be established at least in part by generating a set of account data associated with the new account. The method may comprise transmitting the set of account data to the service provider computing device. The set of account data may be transmitted to the service provider computing device for use by the service provider computing device in a transaction with the user computing device. The transaction may be via the first website and/or the first application. The new account may be established while the user uses the first website and/or the first application without directing the user to a second website of the provider institution. Additionally, the new account may be established while the user uses the first website and/or the first application without directing the user to a second application of the provider institution.

In various implementations, the institution computing system may provide account open functionality through the first website and/or the first application via an application programming interface (API) of the provider institution and/or via a software development kit (SDK) of the provider institution.

In various implementations of the method, the service provider computing device may transmit the account open request to the institution computing system in response to a signal received at the user computing device. The signal may have been received via the first website and/or the first application. The signal may indicate that the user has selected to open the new account with the provider institution.

In various implementations, the set of user data may include a first user data subset received at the service provider computing device from the user computing device before the first website and/or the first application receives a user request to open the new account with the provider institution. Alternatively or additionally, the set of user data may include a second user data subset received at the service provider computing device from the user computing device after the first website or the first application receives the user request to open the new account with the provider institution.

Other embodiments relate to an institution computing system for providing account-open functionality through a service provider computing device of a service provider. The institution computing system may be associated with a provider institution. The institution computing system may comprise a network interface configured to communicate with the service provider computing device via a telecommunications network. The institution computing system may also comprise a processor and a memory having stored thereon instructions that, when executed by the processor, cause the processor to perform specific functions. The instructions, when executed by the processor, may cause the processor to accept an account open request and/or a set of user data. The account open request and/or the set of user data may be received from the service provider computing device via the network interface. The account open request and/or the set of user data may be transmitted by the service provider computing device to the institution computing system via a telecommunications network. The set of user data may be transmitted by a user computing device to the service provider computing device via a first website of the service provider and/or a first application of the service provider. The first website and/or the first application may be accessed by a user using the user computing device. The instructions, when executed by the processor, may cause the processor to establish a new account for the user of the user computing device. The new account may be established at least in part by generating a set of account data associated with the new account. The instructions, when executed by the processor, may cause the processor to transmit the set of account data to the service provider computing device for use by the service provider computing device in a transaction with the user computing device via the first website and/or the first application. The set of account data may be transmitted via the network interface. The new account may be established while the user uses the first website and/or the first application without directing the user to a second website of the provider institution. Additionally, the new account may be established while the user uses the first website and/or the first application without directing the user to a second application of the provider institution.

Other embodiments relate to a method implemented by a service provider computing system associated with a service provider. The method may comprise receiving a set of user data from a user computing device of a user. The set of user data may be received via a website or application of the service provider. The set of user data may be transmitted by the user computing device to the service provider computing system in response to a signal indicating the user has selected to open a new account with an institution. The signal may be received at the user computing device. The signal may be received via the website or application of the service provider. The method may comprise transmitting an account open request and/or the set of user data to an institution computing system of the institution. The account open request and/or the set of user data may be transmitted via a telecommunications network. The method may comprise receiving a set of account data. The set of account data may be received from the institution computing system. The set of account data may be received via the telecommunications network. The set of account data may be for use in a transaction with the user computing device. The set of account data may have been generated by the institution computing system in opening the new account. The new account may be opened without the website or application of the service provider directing the user to a website or application of the institution.

In various implementations, the method may comprise transmitting the account open request to the institution computing system via an application programming interface (API). The method may comprise receiving the set of account data via an API.

In various implementations, the method may comprise receiving one or more selections of items to be purchased by the user. The one or more selections may be received via the website or application of the service provider. The transaction may comprise charging the items to the new account.

In various implementations, the method may comprise presenting information on a task to be performed for a customer of the service provider. The information may be presented via the website or application of the service provider. The transaction may comprise a deposit into the new account for performing the task.

Other embodiments relate to a service provider computing system associated with a service provider. The service provider computing system may comprise a network interface configured to communicate data with an institution computing system via a telecommunications network. The service provider computing system may comprise one or more interface elements providing account open functionality for accounts at an institution associated with the institution computing system. The interface elements may have been acquired via the institution computing system. The service provider and the institution may be third parties with respect to each other. The service provider computing system may comprise a processor and a memory having stored thereon instructions executable by the processor, the instructions being configured to, when executed by the processor, cause the processor to perform specific functions. The instructions may cause the processor to receive a set of user data from a user computing device of a user. The set of user data may be received via a website or application of the service provider. The set of user data may be transmitted by the user computing device to the service provider computing system in response to a signal. The signal may be received at the user computing device. The signal may be received via the website or application of the service provider. The signal may indicate the user has selected to open a new account with the institution. The instructions may cause the processor to transmit an account open request and/or the set of user data to the institution computing system. The account open request and/or the set of user data may be transmitted via the network interface. The instructions may cause the processor to receive a set of account data. The set of account data may be for use in a transaction with the user computing device. The set of account data may have been generated by the institution computing system in opening the new account. The new account may be opened without the website or application of the service provider directing the user to a website or application of the institution.

In various implementations, the one or more interface elements may include one or more software development kits (SDKs) and/or one or more application programming interfaces (APIs). The memory may include instructions that, when executed by the processor, cause the processor to transmit the account open request to the institution computing system via the APIs. The memory may include instructions that, when executed by the processor, cause the processor to receive the set of account data via the APIs.

Other embodiments relate to a mobile computing device. The mobile computing device may comprise one or more user interfaces configured to receive inputs from a user and provide outputs to the user. The mobile computing device may comprise a network interface configured to communicate data with a service provider computing device of a service provider via a telecommunications network. The mobile computing device may comprise a processor and a memory having stored thereon a service provider application retrieved from the service provider computing device and/or from a digital application distribution platform. The service provider application may comprise data defining visually perceptible elements presented via the service provider application. The visually perceptible elements may identify the service provider. The service provider application may include instructions which, when executed by the processor, cause the processor to perform specific instruction. The instructions may cause the processor to present a first set of one or more pages via the one or more user interfaces. The first set of one or more pages may allow a user of the mobile computing device to engage in a transaction with the service provider computing device. The first set of pages may include the visually perceptible elements. The instructions may cause the processor to present an activatable link. The link may be for indicating, via activation or selection, a desire to open a new account with an institution. The service provider and the institution may be third-parties with respect to each other. The instructions may cause the processor to receive, via the one or more user interfaces, a signal indicating activation of the link. The instructions may cause the processor to present a second set of one or more pages for receiving data for opening the new account with the institution. The one or more pages may be presented in response to receiving the signal. The one or more pages may be presented without launching an application of the institution and without directing the user to a website of the institution. The second set of pages may include the visually perceptible elements. The service provider application may allow the user to open the new account at the institution without switching to a website or application of the institution.

In various implementations, the service provider application may include instructions that cause the processor to accept, via the one or more user interfaces, a selection of an item to be purchased from the service provider and/or a task to be performed on behalf of the service provider.

In various implementations, the service provider application may include instructions that cause the processor to present the visually perceptible elements in the first set of screens while the user is transacting with the service provider. The service provider application may include instructions that cause the processor to also present the visually perceptible elements in the second set of pages while the user is opening the new account with the institution.

In various implementations, the second set of pages may include a form with fields for user data. The service provider application may include instructions that cause the processor to prefill one or more of the fields of the form. The one or more fields may be prefilled with user data acquired via the first set of pages of the service provider application.

In various implementations, the service provider application may include instructions that cause the processor to transmit, via the network interface, a first set of data to the service provider computing device. The first set of data may be transmitted while the second set of pages is presented to the user. The service provider application may include instructions that cause the processor to receive, via the network interface, a second set of data from the service provider computing device. The second set of data may be received while the second set of pages is presented to the user. The service provider computing device may transmit the first set of data to an institution computing system. The service provider computing device may transmit the first set of data to the institution computing system via one or more application programming interfaces (APIs). The one or more APIs may provide account open functionality. The service provider computing system may receive a third set of data from the institution computing system. The first set of data may include a first subset of data acquired via the first set of pages, and a second subset of data acquired via the second set of pages. The first set of data may include user data to be associated with the new account being opened, and the second data may indicate whether the new account was successfully opened. The third set of data may include account information to be used by the service provider computing device for one or more subsequent transactions between the user and the third party. The subsequent transactions may include the user receiving funds into the new account for performing a service for a customer of the service provider. The subsequent transactions may include the user making a payment using the new account for goods or services received via the service provider.

BRIEF DESCRIPTION OF THE DRAWINGS

FIGS. 3A-3D are example graphical user interfaces including pre-authentication information, according to an example embodiment.

DETAILED DESCRIPTION

Figure 1:
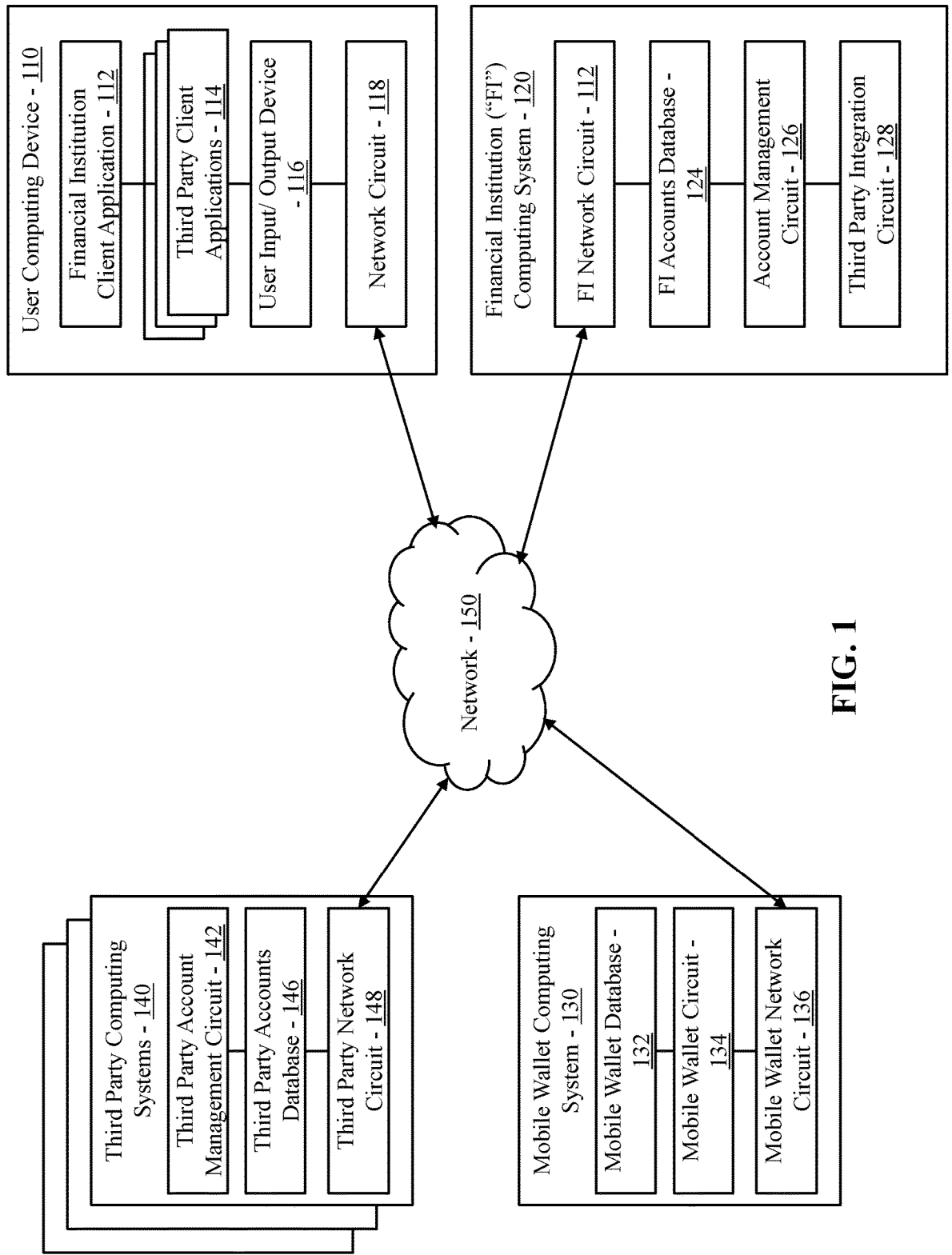
FIG. 1 is a block diagram of a computer-implemented system, according to an example embodiment.

Various embodiments described herein relate to systems and methods for providing users frictionless access to a plurality of different functionalities conventionally only accessible through a diverse array of avenues. In various embodiments, a financial institution computing system provides or otherwise facilitates the operation of a client application on a user device. The client application is configured to enable access to a broad array of financial services with high efficiency. In a first aspect, a presentation tier of the client application is configured to present a multi-feature graphical user interface ("GUI") to the user. The multi-feature GUI enables the user to select from a diverse array of services from within a single screen. For example, in one embodiment, the integration GUI includes an account information portion and a plurality of transactions features (e.g., buttons, icons, links, etc.). The account information portion enables the user to select an account and, for example, view a balance associated with the account. The payment features enable the user to conduct a plurality of types of transactions (e.g., bill payments, person-to-person ("P2P") payments, mobile wallet payments, automated teller machine ("ATM") transactions, transfers to other accounts, etc.) via the user device using the account selected via the account selection portion. Technically and beneficially, such an arrangement enables the user to utilize a plurality of different payment combinations (e.g., combinations of accounts and payment types) via a single screen. This eliminates the need for the user to switch back and forth between various applications or screens, thus improving the efficiency of the user device's operation.

In another aspect, the client application is configured to pre-emptively request certain forms of information (herein referred to as "pre-authentication user information" or "PUT") pertaining to financial services prior to requiring the user to authenticate herself. In various embodiments, the user may set preferences identifying PUT to render visible via the client application. In an example, the user may designate balance information pertaining to a checking account as PUT. As a result, the user is able to view the balance of the checking account on the integration GUI prior to authentication. In various other examples, users may designate various other forms of information as PUT (e.g., account activation statuses, payments due, pending transactions, transaction histories, etc.). Technically and beneficially, this enables the user to efficiently make decisions regarding payments with the accounts, reducing the operation time of the client application necessary to perform various operations.

In yet another aspect, the financial institution computing system eliminates the need for users to access the client application to access various services accessible therein. In this regard, the financial institution computing system includes a plurality of software integration packages deliverable to a plurality of third party computing systems providing users with additional services. The software integration packages may include multiple components to facilitate or enable various functionalities contained within the client application in applications and/or websites provided via the third party computing systems. For example, a first software integration package may include an applet and an associated application programming interface ("API"). The applet may be transmitted or otherwise stored at one or more third party computing systems such that the applet is exposed (e.g., as an associated widget) in the provision of third party services. The API may be implemented at the financial institution computing system to determine information access permissions for a user via the widget. In an example, via a third party calendar application including a bill payment applet, the user may select, via an associated widget, to provide the third party calendar application with the user's bill payment information. In response, the third party calendar application may update the access permissions at the financial institution computing system via an associated API such that the user's bill payment information is shared with the calendar application. Once this process is completed, the user is able to schedule and make bill payments via the applet, thus providing an efficient platform for the user to access a service from within a third party platform. In various embodiments described herein, the financial institution computing system includes a plurality of such APIs (referred to herein as an "API bank" or "interface bank") for facilitating the provisioning of different information to different third parties depending on the functionalities integrated or desired to be integrated into the third party services. For example, the financial institution computing system may selectively enable subsets of APIs to provide customized sets of information to different third parties. This enables third parties to flexibly integrate financial institution services into third party services to create streamlined user experiences. Additionally, by using customized subsets of the API bank for particular third parties, the systems and methods herein facilitate information retrieval and delivery for third parties seeking to integrate financial institution products into third party services. In other words, third parties obtain only information needed to integrate pre-identified (e.g., pre-selected by the third party or selected via the financial institution) financial institution services within third party services. This reduces data processing requirements at both the financial institution computing system and the third party system to enhance efficiency of third party integration.

In yet another aspect, a provider computing system allows third-party service providers to implement account open functionality from within their own websites, applications, portals, gateways, or other electronic platforms. The provider computing system can be associated with a provider of financial services, such as a bank. As used herein, the terms "provider," "provider institution," and "institution" are interchangeable and may refer to a financial institution. Similarly, a "provider computing system" is interchangeable with "institution computing system" and "financial institution computing system." Also as used herein, "third party" and "service provider" are interchangeable. Also as used herein, a service provider is any merchant, business, or other entity which offers goods and/or services itself, or brokers goods and/or services from other entities. Also, as used herein, opening an account involves establishment of a new financial account or other account (e.g., bank account, credit card, loan, investment account, etc.) which has an associated unique identifier (e.g., a bank account number, loan number, or credit card number, etc.). Also as used here, account open functionality refers to the ability to apply for or otherwise request that a new account be established (or existing account be activated) in the applicant's/requestor's (or other entity's) name. Providing account open functionality from within a third-party platform refers to the ability to allow a user to apply for or request the new account using the third-party platform, without being directed to the electronic platform or operating environment (e.g., the website, application, portal, gateway, etc.) of another entity (e.g., a third party such as the financial institution or an agent or representative of the financial institution, etc.). The electronic platforms of the financial institution and the third party have their own operating environments that may be separately maintained by computing systems with their own security protocols and that may have their own distinguishing characteristics in terms of appearance and functionality.

In various implementations, third parties may provide account-open functionality for opening an account (e.g., a financial account at the financial institution) via one or more interface elements, such as account-open APIs and/or account-open software development kits (SDKs). APIs may be part of an API Bank administered or provided by the financial institution. A third party, such as a service provider or other merchant, may use an account-open API and/or SDK to incorporate account-open functionality into its own platform. For example, a third party may use such APIs to incorporate account-open functionality into a website or application (e.g., a mobile application running on user computing devices) of the third party. The third party may then, at suitable times in its electronic interactions with a customer, allow the customer to indicate, via the website or application of the third party, a desire to open an account. The indication may be provided via any user interface mechanism deemed suitable, such as via touchscreen, voice prompt, keypad, etc.

In various versions, a website or application of the service provider may allow a user to select to use a new account (as opposed to using an existing account) for one or more financial transactions with the service provider. The selection may identify a financial institution through which the new account would be opened. In some implementations, the service provider is a broker between the user and a customer who receives goods and/or services from the user and pays the service provider, which then compensates the user (e.g., by transferring the amount received to the user, minus an agreed-upon fee). The user may thus be, in various implementations, an independent contractor, representative, or agent of the service provider. The user may perform "gigs" for customers of the service provider, each of which may receive a proportion of the monies received for the gig from the customer. Examples of such service providers are Lyft™ and Airbnb™. In other implementations, the user may be purchasing goods or services from the service provider (such as a merchant), and the service provider may provide the user with the option of opening a new account to be used for the purchase as one option for paying for the goods.

Once the user selects opening a new account, in various implementations, the service provider's systems may communicate with the financial institution's systems to exchange the data needed for the new account. From the user's perspective, account open functionality may be implemented via back-end processes involving the service provider's computing systems and the financial institution's computing systems. The user may use the same website or application through which the user selected to open a new account, without having to leave the website or application for the process of opening (e.g., applying for or requesting) a new account. In some implementations, the user may be provided with a new page or screen, or be allowed to scroll down the same page or screen, within the same operating environment during the process of entering or otherwise submitting information as part of a new-account request/application process (e.g., the account request or application process that would otherwise have been implemented via the website or client application of the financial institution). Advantageously, because the user can remain in the same operating environment, the service provider can more easily select, direct, or control the user experience. For example, the user may be presented with various perceptible elements (e.g., logos, trade or service marks, text fonts and colors, sounds, etc.) before and after the user indicates his or her desire to open a new account with the financial institution.

Additionally, the information already received from a user computing device (e.g., to engage in transactions with the service provider) may be reused by the service provider for the account-open process. For example, the user may have already provided certain user data when registering for or otherwise arranging a transaction with the service provider. This may include biographic data (e.g., name, address, etc.), financial information (e.g., income), preferences, etc. Those data, or a subset thereof, may be provided to the financial institution computing system for association with the new account. Additional data may be collected by the service provider computing device if the user computing device did not acquire certain information that is not required for transacting business with the service provider, but that is required for opening the new account via the financial institution computing system. The additional data may be provided by the user via the service provider website or service provider application and may be transmitted to the financial institution computing system by the service provider computing system or by the user computing device.

The routine, conventional approach to opening a new account is to have a customer or other user open the account directly with the financial institution. This is often accomplished by having the user visit a website, launch a software application, or visit a physical branch of the financial institution. If a suggestion to open a new account with the financial institution is received via a third party (e.g., in an advertisement on a third party website), the third party conventionally offers a link or otherwise directs the user to the financial institution's website. The user then submits the requested information via the financial institution's website as part of a process of applying for a new account, separately from the online activities that gave rise to the suggestion to open the new account with the financial institution and the resulting delay and inconvenience. Once the online application process is completed, the user may then return to the third party website, if so inclined, and proceed as before.

Moreover, during the application process, when a customer uses the website or application of the financial institution to request that a new account be opened, the user experience is dictated by the financial institution. For example, when a user is directed to a website of the financial institution to apply for a new account, the layout, organization, style, and functionality of the website is controlled or otherwise determined by the financial institution. As a result, the user perceives the visual (or nonvisual elements, such as sounds) as dictated by the financial institution's website or application. The website or application of the entity that directed the user to the financial institution's website or application conventionally may not direct aspects of the user experience.

Further, when customers apply for new accounts (e.g., via a website or application of the financial institution), the customers may be notified at the conclusion of the application process as to whether the customer has been approved. For example, a customer may apply for a credit card or bank account at a bank, online at the bank's website, or using a mobile application of the bank. Once the customer has provided all the requested information, and the bank has run any required credit or other checks, the customer may be notified shortly thereafter as to whether the new account has been approved or declined, or stalled due to a need for additional information. However, the new account is not usable for some time, such as until the user receives a letter via a physical postal system with a credit or debit card or other account information. Conventionally, the user is unable to use the account to make a purchase at a merchant (e.g., at a point of sale terminal or online via an e-commerce platform) until some time later (e.g., for 7 to 10 business days), at which point the user may be required to manually enter the account information (e.g., account number, expiration date, etc.) needed for identifying the account to be used for subsequent transactions.

It is unconventional to allow third parties to present a user with an offer or suggestion of opening a new account with a financial institution, without directing the user to the financial institution's website for the process of opening the new account, and having the user return to third party once the new account has been established and is usable. It is also unconventional to have a new account be usable without requiring the user (e.g., the account holder) to await receipt of the account data (e.g., via a letter mailed via the Postal Service) and submit the account data (e.g., via manual entry using a keyboard) for subsequent use in one or more transactions. It is moreover not routine or conventional to have the third party continue to present its own perceptible elements, which may be visually perceptible screen elements (e.g., distinguishing logos, marks, text fonts and colors, or other perceivable outputs used regularly by the third party, etc.) or otherwise control or direct what the user sees, hears, or otherwise experiences during the new account application process. Furthermore, it is not routine or conventional to allow a customer to set up an account for immediate or short term (e.g., same-day) use once the customer is notified that he or she has been approved for the new account. The conventional approaches pose unique technological challenges that are tackled by the disclosed technological solutions.

The disclosed systems, methods, and computer implementations also improve current computing systems and payment systems by establishing accounts and facilitating payments between parties via a reduced number of authenticated communications sessions. For example, conventionally, a provider may communicate with a third party via one or more authenticated communications sessions to set up one or more accounts to be used by the third party to receive funds from customers of the third party, and to provide funds to users who provide services to the customers (e.g., users who perform gigs as freelancers, independent contractors, etc.). In one or more separate authenticated communications session, the provider may communicate with a user to set up a new account to be used to make payments and/or to receive payments for services provided to customers of the third party. Once the user's new account is set up, the user may, in one or more separate authenticated communications session with the third party, provide the third party with the new account information (e.g., by entry of account numbers). The third party may then link that account with other relevant accounts or otherwise set up the new account for use for fund transfers into or out of other accounts. Each time a communications session is established and communicating parties are authenticated with each other, time and computing resources are required. By reducing the number of communications sessions that is required for setting up accounts and arranging payments, the clock time, processing time, programmatic instructions (e.g., for authenticating a user account) and other requirements of the central processing unit, memory utilization, and other system resources are reduced. Accordingly, system security is improved, accounts are set up (e.g., established and linked) more efficiently, and payments are more quickly completed than with current systems.

The disclosed systems, methods, and computer implementations improve current computing systems and payment systems by facilitating payment between two parties for forming a link between the parties without necessarily requiring the parties to interact with one another in person or to know any (or as much) personal information about one another while still being able to transact with one another via a near-field communication transceiver. The clock time, processing time, programmatic instructions required to authenticate a user account, and other requirements of the central processing unit, memory utilization, and other system resources are reduced because a transaction between the parties is accomplished by only having access to only minimal data about the other party (e.g., a proximity of the other party) without requiring the provisioning of traditionally exchanged information needed to conduct mobile wallet transactions. Accordingly, system security is improved and payments are more quickly completed than current payment systems.

The GUI displayed on the user devices can present a notification to the respective user providing a summary of transactions and account setups. The notification can be provided in the form of an application summary reachable directly from a menu of the mobile device of the user (e.g., by hovering over an application icon of a mobile wallet application or client application, by selecting the application icon without actually launching the application). The application summary indicates a summary of the payment (e.g., an amount of the payment or deposit). By selecting the application summary, the mobile wallet application or client application may be launched and automatically navigated to a sub-screen of the mobile wallet application or client application providing additional and more specific details of the transaction (e.g., time of transaction, currency used, whether the payment is a repeat payment from a same prior payer). The application summary can provide a summary of more than one transactions (e.g., a list of payment amounts received organized by transaction time). Accordingly, the application summary may provide only limited data when the mobile wallet application or client application is in an unlaunched state, and further details of each transaction can be accessed by selecting the corresponding transaction summary to automatically launch the mobile wallet application or client application and to be automatically navigated to the corresponding sub-screen displaying additional and more specific details of the transaction, thereby providing an improved GUI for electronic devices, and particularly electronic mobile devices.

The disclosed systems, methods, and computer implementations also improve current computing systems and payment systems by facilitating payment between two parties (e.g., between a user performing a gig for a customer of a third party) by forming a link between the parties without requiring the parties to exchange financial information about one another while still being able to transact with one another (via, e.g., a near-field communication transceiver). The clock time, processing time, programmatic instructions required to authenticate a user account, and other requirements of the central processing unit, memory utilization, and other system resources are reduced because a transaction between the parties is accomplished by only having access to only minimal data about the other party (e.g., a proximity of the other party) without requiring the provisioning of traditionally exchanged information needed to conduct payment transactions. Accordingly, system security is improved and payments are more quickly completed than current payment systems.

Referring now to FIG. 1, a block diagram of a computer-implemented system 100 for providing a multi-functional client application is shown, according to an example embodiment. As shown, the system 100 includes a user device 110 associated with a user, a financial institution computing system 120 associated with a financial institution, a mobile wallet computing system 130 associated with a mobile wallet provider, and one or more third party computing systems 140 associated with various third parties. The various systems and devices may be communicatively and operatively coupled through a network 150, which may include one or more of the Internet, cellular network, Wi-Fi, Wi-Max, a proprietary banking network, or any other type of wired or wireless network or a combination of wired and wireless networks. As described herein, the system 100 may be used to provide client applications on the user device 110, such as multi-functional client applications or client applications of third-party service providers.

Third party computing systems 140 are computing systems associated with various third parties. As used herein with respect to third party computing systems 140, "third parties" refer to entities that provide various electronic (e.g., web or application-based) services. While conventionally these third parties provide their services independent of the financial institution, according to the present disclosure, the system 100 includes various features to facilitate the integration of the services provided via the third party computing systems 140 and those provided by the financial institution. The "services" may include, but are not limited to payment-related services such as online shopping, search engines, product review services, issuer-specific financial rewards, social media accounts, security services, broker services, and the like.

Third party computing systems 140 include a third party account management circuit 142, a third party accounts database 146, and a third party network circuit 148 that enables the third party computing system 140 to exchange data, information, values, and the like over the network 150. The third party accounts database 146 is structured to retrievably store user information relating to user relationships with the third party, and may include non-transient data storage mediums (e.g., local disc or flash-based hard drives, local network servers, and the like) or remote data storage facilities (e.g., cloud servers). Third party account database 146 may include information pertaining to user accounts with the third party. The information stored in the third party account database 146 varies depending on the particular service provided by the third party computing system 140.

The third party account management circuit 142 is structured to provide the user with access to the third party computing system 140 to manage one or more of their accounts held by the third party. As will be appreciated, the functionalities performed by the third party account management circuit 142 will vary depending on the nature of the service provided at the third party computing system 140. In some embodiments, the third party account management circuit 142 is configured to provide an application (e.g., a third party client application 114) on various user devices 110. The application may provide users with various displays enabling the users to take advantage of the various functionalities provided by the third party computing systems 140.

In various embodiments, the third party computing system 140 includes various software components such as various SDKs that facilitate, enable, or otherwise permit the third party to integrate various functionalities provided by the financial institution into services provided via the third party computing system 140. For example, in various embodiments, the financial institution associated with the financial institution computing system 120 provides access to an SDK to facilitate the development of applets providing users with access to functionalities accessible to the user via the financial institution computing system 120. Via the applets, such functionalities may be exposed via the services at the third party computing systems 140 to provide broad access to the financial institution's services. Each applet may be associated with a particular type of functionality (e.g., information) provided via the financial institution, and be associated with an API at the financial institution computing system 120 configured to facilitate the provisioning of the necessary information for accessing the functionality. As described herein, the financial institution computing system 120 includes an API bank (e.g., as a part of the third party integration circuit 128) selectively enabling the third party computing systems 140 to access the information maintained by or otherwise associated with the financial institution via the applets, depending on the needs of the third party.

The mobile wallet computing system 130 is structured to permit, enable, facilitate, manage, process, and otherwise allow mobile wallet transactions. As used herein, the term "mobile wallet transaction" refers to transactions performed via some form of communications between a sales device (e.g., a POS device) and a mobile communications device (e.g., the user computing device 110 or any other form of computing). The mobile wallet computing system 130 may be associated with, owned by, and/or otherwise operated by a mobile wallet provider. In one embodiment, the mobile wallet provider may be a financial institution, such as the financial institution associated with the financial institution computing system 120. In this instance, the mobile wallet computing system 130 may be a part of the financial institution computing system 120. In another embodiment and as shown, the mobile wallet provider may be a third party provider relative to the financial institution that operates the financial institution computing system 120.

In any configuration, the mobile wallet computer system may provide or at least partly provide a mobile wallet circuit 134. As described in more detail herein, the "mobile wallet" is a digital wallet provided on, for example, the user device 110. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities, functions, and features that are described herein in more detail.

In arrangements where the mobile wallet provider is the financial institution associated with the financial institution computing system 120, each of the operations described herein with respect to the mobile wallet computing system 130 may also be described as being performed by the same financial institution. In such arrangements, the financial institution computing system 120 and the mobile wallet computing system 130 may be operated as a single computing system, or as two or more separate computing systems (as shown in FIG. 1) performing the associated functions described herein. As will be appreciated, the level of functionality that resides on the financial institution computing system 120 as opposed to the mobile wallet computing system 130 in these arrangements may vary depending on the implementation.

With the above in mind, the mobile wallet computing system 130 is shown to include a mobile wallet database 132, a mobile wallet circuit 134, and a mobile wallet network circuit 136 enabling the mobile wallet computing system 130 to exchange data over the network 150. The mobile wallet computing system 130 may be configured to exchange data with the user device 110, financial institution computing system 120, and third party computing systems 140 in the implementation of a user mobile wallet.

Mobile wallet database 132 is structured to store information regarding mobile wallet accounts held by various users, such as for a mobile wallet account held by the user of the user device 110. For instance, the mobile wallet database 132 may store various forms of information related to the user and/or an associated mobile device upon registration of one or both for a mobile wallet. The stored mobile wallet account information may include authentication information (e.g., username/password combinations, device authentication tokens, security question answers, etc.), payment card information, transaction histories, account holder identifying information, registered device information, and any other information that may be encountered in the operation of a mobile wallet account or otherwise referenced herein. Such information may include user preferences and other information comprising a user profile. In some arrangements, for example, mobile wallet database 132 also includes a token vault that is maintained by the mobile wallet computing system 130. The token vault may include a lookup table maintaining tokens associated with various user payment vehicles. The tokens stored therein may be generated internally (e.g., at the mobile wallet computing system 130) or by other entities (e.g., a token service provider computing system). For example, in one embodiment, the token vault may include a lookup table including tokens that that have been randomly assigned to a user payment vehicle (e.g., user checking accounts, credit/debit cards, and the like) by the mobile wallet computing system 120. In some arrangements, the mobile wallet computing system 130 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer.

The mobile wallet circuit 134 is structured to provide a mobile wallet on the user device 110. In some embodiments, the mobile wallet circuit 134 is structured to provide a mobile wallet client application on the user device 110. In this regard, the mobile wallet circuit 134 enables registrations of a user for a mobile wallet, presents the user with various user interfaces enabling user to use or manage a mobile wallet, and enables users to perform transactions using the mobile wallet (e.g., as described with respect to the financial institution client application 112 herein).

The financial institution computing system 120 is a computing system at a financial institution that provides and maintains one or more financial accounts (e.g., demand deposit account, credit or debit card account, brokerage account, mortgage account, etc.) on behalf of the user. In some arrangements, the financial institution is an issuer of a payment vehicle held by the user. The payment vehicle may be used as a source payment vehicle for transactions engaged in via the user's mobile wallet. In the context of the present disclosure, the financial institution can include commercial or private banks, credit unions, investment brokerages, mobile wallet providers, and so on, but can also include any commercial entity capable of maintaining payment vehicles on behalf of a user, including retailers, vendors, service providers, and the like. For example, in one embodiment, the financial institution can be a merchant implementing a loyalty card program including a loyalty card. The loyalty card may be provisioned to the user's mobile wallet such that the user may conduct mobile wallet transactions with the loyalty card. In some arrangements, the financial institution is also a mobile wallet provider configured to manage mobile wallet accounts on behalf of its customers (i.e., users), including authenticating mobile wallet transactions involving debits from the users' payment vehicles. For example, the financial institution may also operate the mobile wallet computing system 130 in various embodiments.

The financial institution computing system 120 includes a financial institution network circuit 122 enabling the financial institution computing system 120 to exchange data over the network 150, a financial institution accounts database 124, an account management circuit 126, and a third party integration circuit 128. The financial institution accounts database 124 is structured to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The account management circuit 126 is structured to manage the financial accounts of various users, including maintaining and handling transaction processing for the user's one or more financial accounts. In some embodiments, the financial institution client application (herein "client application") 112 is provided by the account management circuit 126. In this regard, the account management circuit 126 is configured to provide information, values, commands, and the like used to render various displays to aid the user in accessing the various functionalities described herein.

For example, in some embodiments, the account management circuit 126 is configured to receive various account management preferences from, for example, the user device 110. Some of such user preferences may include designations of PUI. As described herein, via the client application 112, the user may specify various forms of information that the user wishes to be accessible prior to authentication via the financial institution client application 112. Such information may include various identities of user accounts (e.g., actual account numbers, surrogate account numbers, account names, etc.), balances associated with the user accounts, transaction histories associated with the user accounts, and other information.

The financial institution client application 112 may configure the user device 110 to request such information from the financial institution computing system 120 at various points in various data processing flows associated with functionalities provided via the client application 112. For example, as described herein, a multi-feature GUI servicing as a home screen of the client application 112 may include balances of user accounts. As such, upon the user's initiation of the client application 112 on the user device 110, the user device 110 may request balance information from the financial institution computing system 120. In response to the requests, the financial institution computing system 120 may cross-reference the requested information with the user's PUI designations and, if in accordance with the designations, grant the request by transmitting the information to the user device 110. Thus, the account management circuit 126 facilitates the user customizing data accessible via various data processing flows within the client application 112 to facilitate streamlined access to various services.

The third party integration circuit 128 is configured to arbitrate or otherwise manage various information requests received from the third party computing systems 140 to facilitate the integration of the financial institution's services into those provided by third parties. In this regard, the third party integration circuit 128 may include a plurality of APIs (herein referred to as an "API bank") that facilitate the sharing of varying types of information with different third parties. The information shared may depend on that which is necessary to integrate a particular financial institution functionality into a third party service. For example, if a particular third party (e.g., associated with a third party client application 114) wishes to integrate a mobile wallet provided via the financial institution into the third party client application 114, the third party integration circuit 128 may update access permissions associated with a wallet API to provide the third party with access to a user's wallet information. This may facilitate the third party integrating a wallet applet (e.g., via an associated applet developed through an SDK), into the third-party application, enabling the user to conduct mobile wallet transactions from within a third party client application 114. Other such examples (e.g., for P2P payments, account balance checks, bill payment information, transaction histories, etc.) are also envisioned.

Various other forms of information sharing relationships are possible. For example, the financial institution computing system 120 may enable third parties to offer a mortgage or other financial product from within third party services. In a third party website, for example, an icon may be displayed enabling a user to indicate a preference to apply for a mortgage. To facilitate the application, the third party integration circuit 128 may include a mortgage-API accessible to the third party to request necessary information and approve the user for a mortgage in response to the user selecting the icon. As such, the API bank facilitates numerous forms of information sharing relationships and enables the financial institution to dynamically update access permissions for the third parties in response to third party requests.

Similarly, the financial institution computing system 120 may enable third parties to offer a new account from within third party services. In a third party website or application, for example, an icon may be displayed enabling a user to indicate a preference to apply for or request a new account. To facilitate the process of applying for or requesting the new account, the third party integration circuit 128 may include an account-open API accessible to the third party computing device 140 to request necessary information via the user computing device 110 and approve the user for a new account in response to the user selecting the icon via the service provider website or application.

The user device 110 is a computing device associated with the user. The user may include one or more individuals, business entities, government entities, and agents. The user device 110 is structured to exchange data over the network 150, execute software applications, access websites, generate graphical user interfaces, and perform other operations described herein. The user device 110 may include any sort of computing device, such as a smartphone, personal computer, a wearable computing device (e.g., eyewear, a watch or bracelet, etc.), a tablet, a portable gaming device, a laptop, and any other form of computing device (e.g., a smart appliance, a smart speaker, etc.).

The user device 110 includes a client application 112, third party client applications 114, a user input/output ("I/O") device 116, and a network circuit 118 enabling the user device 110 to exchange information over the network 150. The user I/O device 116 includes hardware and associated logics configured to enable the user device 110 to exchange information with a user and other devices (e.g., a merchant transaction terminal). An input aspect of the user I/O device 116 allows the user to provide information to the user device 110, and may include, for example, a mechanical keyboard, a touchscreen, a microphone, a camera, a fingerprint scanner, any user input device engageable to the user device 110 via a USB, serial cable, Ethernet cable, and so on. An output aspect of the user I/O device 116 allows the user to receive information from the user device 110, and may include, for example, a digital display, a speaker, illuminating icons, LEDs, and so on. The user I/O device 116 may include systems, components, devices, and apparatuses that serve both input and output functions, allowing the financial institution computing system 120 exchange information with the user device 110. Such systems, components, devices and apparatuses include, for example, radio frequency transceivers (e.g., RF or NFC-based transceivers) and other short range wireless transceivers (e.g., Bluetooth®, laser-based data transmitters, etc.).

The user device 110 further includes a client application 112. The client application 112 is structured to facilitate and permit conductance of transactions and management of accounts held by the user (e.g., at the financial institution associated with the financial institution computing system 120 and/or other financial institutions). Accordingly, in some arrangements, the client application 112 is communicably coupled via the network circuit 118 over the network 150 to the financial institution computing system 120. In some embodiments, the client application 112 includes a circuit embodied within the user device 110. For example, the client application 112 may include program logic stored in a system memory of the user device 110. In such arrangements, the program logic may configure a processor of the user mobile device to perform at least some of the functions described herein with respect to the client application 112. In some embodiments, the client application 112 is a web-based application (e.g., provided via the financial institution computing system 120). As will be understood, the level of functionality that resides on the user device 110 versus the financial institution computing system 120 will vary depending on the implementation.

In some embodiments, the client application 112 includes or is otherwise associated with a mobile wallet implemented on the user device 110. For example, the client application 112 may include a mobile wallet circuit therein that facilitates communications via the user device 110 to the mobile wallet computing system 130 enabling access to a user mobile wallet. In such embodiments, the client application 112 is structured to permit mobile wallet users to engage in transactions through the initiation of communications with, for example, a merchant point of sale ("POS") device. For example, in some embodiments, the client application 112 includes a payment application facilitating exchange of mobile wallet credentials (e.g., tokenized account information) with the POS device. In this regard, the client application 112 may interface with a near field communications ("NFC") chip controller to exchange the mobile wallet credentials.

It should be understood that the role that the client application 112 takes in payment transactions will depend on the implementation of the mobile wallet. In some arrangements, for example, the mobile wallet is implemented in a secure element framework. In such arrangements, the user device 110 includes a secure element that is separate from the main system memory of the user device 110. The secure element refers to a tamper-resistant platform that hosts various applications and confidential information associated therewith. The secure element may include, but is not limited to, a universal subscriber identity circuit (a SIM card), a trusted execution environment, and/or a secure digital card. In such arrangements, user authentication information (e.g., payment account information, user PINS, and the like) is stored in the secure element. In various arrangements, the secure element of the user device 110 may include a payment application that interfaces with the NFC chip of the user device responsive to receiving a communication (e.g., an application protocol data unit) from the POS device to enable user payment information be transferred. In such arrangements, no user information is transferred by the client application 112 to the NFC chip. After user payment information is transmitted to the POS device, the client application 112 may query the secure element for transaction data to notify the user of the completed transaction.

In other arrangements, the client application 112 may operate under a host card emulation framework. In such arrangements, user payment information is maintained within the client application 112 or cloud-based environment (e.g., a host emulation service) rather than in the secure element. In this regard, the client application 112 may include a service component (e.g., a payment application) configured to interface with the NFC chip of the user device 110 to communicate user payment tokens to the merchant point of sale device. To ensure security of user information, the client application 112 may include sandboxing functionalities where a unique user ID (UID) is assigned to the client application 112, and where only other applications (e.g., third party client applications 114) including the same UID may share information stored in relation to the client application 112.

In various other arrangements, the user-specific payment information may be stored in a trusted execution environment ("TEE") within a processor the user device 110. The systems and methods disclosed herein may also be used with other modalities currently available for storage and transfer of user payment device via contactless communication mechanisms. In the example shown, the client application 112 operates under an HCE framework. As such, to conduct a mobile wallet transaction utilizing the client application 112, the user device 110 may communicate with the mobile wallet computing system 130 (or other system) to retrieve a token for use in the conductance of a mobile wallet transaction.

In some arrangements, the client application 112 is structured to enable the user to manage a mobile wallet and other accounts held at the financial institution. In this regard, the client application 112 includes a presentation tier configured to control and manage displays or GUIs presented to the user via the client application 112. As described herein, the presentation tier includes access points to a diverse array of functionalities to streamline the user's experience. For example, the presentation tier may be configured to present the user with the multi-feature GUI described with respect to FIG. 3A herein.

In another aspect, the client application 112 includes an authentication sequence that significantly departs from those of existing systems to further streamline the customer's access to various features. For example, in various existing systems, authentication of the user is required prior to the user viewing various forms of information (e.g., account balance information) or performing tasks (e.g., entering a payment amount for a P2P transaction, selecting an account, etc.) to conduct a transaction. This may prevent the user at times from utilizing various functions, as the user may prefer to avoid the authentication if busy.

To cure these deficiencies, the client application 112 is structured to cause the user device 110 to request PUI from, for example, the financial institution computing system 120 in response to various pre-conditions. An example of such a pre-condition may include the user entering the client application 112, which may cause the user device 110 to request PUI used to populate the home-screen of the client application 112. Such information may include, for example, a listing of user accounts and balances associated with the user accounts. Another pre-condition may involve the user indicating a preference to conduct a mobile wallet transaction, which may cause the user device 110 to request a listing of accounts that have been provisioned to the user's mobile wallet (e.g., from the mobile wallet computing system 130). Additional examples are described with respect to FIG. 2.

In some embodiments, the client application 112 includes an interactive chat bot feature enabling the user to dictate data process flows by inputting commands in everyday language. For example, in some embodiments, the client application 112 includes a function-to-keyword lookup table such that a corresponding function of the client application 112 is called in response to the user inputting a command. In one example, the user may provide an input (e.g., by typing a message into a message prompt or providing a voice command) to view a balance of a checking account. In response, via the function-to-keyword lookup table, an appropriate function is called to request balance information of the checking account from the financial institution computing system 120 and present it to the user. Other functionalities (e.g., the mobile wallet, bill payments, card-free ATM, etc.) described herein may be accessed in a similar manner. As such, the client application 112 provides personable access to various features described herein.

Third party client applications 114 are structured to provide the user with access to services offered by various third parties. In some arrangements, the third party client applications 114 are hard coded into the memory of the user device 110. In another embodiment, these applications are web-based interface applications, where the user has to log onto or access the web-based interface before usage, and these applications are supported by a separate computing system comprising one or more servers, processors, network interface circuits, or the like (e.g., third party computing systems 140), that transmit the applications for use to the mobile device.

In various embodiments, the third party applications 114 include elements providing access to products offered by or otherwise associated with the financial institution. For example some such products may be related to conducting various forms of transactions (e.g., via a mobile wallet, bill payments, etc.) using services provided by the financial institution. Accordingly, the third party applications 114 may include applets exposing various elements enabling the user to access services offered by the financial institution within the third party application 114. Such access may be enabled or otherwise facilitated by various APIs. For example, one API may enable a transfer of user account information to a third party computing system 140 to facilitate the user selecting an account and making a payment within the third party computing system 140 (e.g., via the mobile wallet provided via the mobile wallet computing system 130).

In some embodiments, various other products (e.g., mortgages, lines of credit, other forms of loans, etc.) offered by the financial institution may be accessible to the user via a third party applications 114. For example, one third party computing system 114 may offer the user a set of products offered by the financial institution. The set of products may be tailored based on needs of the third party. For example, one third party offering a calendar application may offer a bill payment service to the user via an associated third party client application 114. In response to the user accepting the offer, an API may facilitate the exchange of user bill payment information to the third party computing system 140 to enable the user's bill payments to be presented via a calendar. In another example, a third party assisting users in forming a business may offer an incorporation service to the user, and an API may facilitate the transfer of necessary information (e.g., documentation pertaining to incorporation or taxes) to the third party computing system 140 in response to the user accepting the offered service. Such integration facilitates the seamless provision of services to the user without requiring the user to even open the client application 112.

The client application 114 may also be structured to facilitate transactions and management of accounts held by, for example, the user at a third-party service provider associated with the third party computing system 140. Accordingly, in some arrangements, the client application 114 is communicably coupled via the network circuit 118 over the network 150 to the service provider computing system 140. In some embodiments, the client application 114 is a web-based application (e.g., provided via the third party computing system 140). As will be understood, the level of functionality that resides on the user computing device 110 versus the third party computing system 140 will vary depending on the implementation.

In certain arrangements, the third party client application 114 is structured to allow the user to provide goods or services (e.g., perform "gigs") for customers of a service provider associated with the third party computing system 140. The client application 114 may allow the user to register with the service provider by providing certain user data, such as biographical information and characteristics of the goods and services being offered by the user. The user data collected by the third party computing system 140 allows the service provider to better vet users and match particular users with particular customers who are seeking the specified goods or services. Users may be matched with, for example, customers who wish to be transported from one place to another, or who wish to have lodging in a certain location for a certain time period, or who wish to receive any other goods or services the user can provide.

When a potential customer is found by the service provider, the third party computing system 140 may provide information related to the potential customer to the client application 114 for review by the user (and information related to the user may be provided to the customer via a client application 114 running on a user computing device 110 of the customer). The user and customer may engage in a transaction, and in exchange for goods or services provided by the user to the customer, the customer may remit payment via the third party computing system 140 of the service provider (via, e.g., the same or another client application running on the user computing device 110 of the customer). The service provider may receive a share of the payment (e.g., a predetermined percentage and/or a fixed transaction fee), and the remainder of the payment may be for the user. The third party computing system 140 may then make a funds transfer into an account of the user (e.g., after each gig, after a predetermined number of gigs, or once a certain threshold has been reached) for the remainder.

Because the user may not have an account, or may not have an account the user would like to use for transactions with customers of the service provider, the user may wish to open a new account to be used to receive the payments from the service provider. Traditionally, this is accomplished by the user directly engaging a financial institution as part of a separate process. As described herein, in various implementations, the client application 114 may provide the user with the option to open a new account with a financial institution for receiving funds from the service provider. From within the client application 114 (which may be a browser if the user is using a website of the service provider), the user may choose to open a new account for use with transactions involving the user and customers of the service provider. The third party computing system 140 may then communicate with a financial institution computing system 120 (via network 150) to open the account and receive the associated account data needed by the third party computing system 140 to make funds transfers into the new account. The new account setup can occur as a back-end process that does not require directing the user to a website or application of the financial institution.

The third party computing system 140 (which may include one or more computing devices) may use one or more interface elements to provide users with various functionality, such as account-open functionality. The interface elements may be acquired via the provider computing system 120 (which may include one or more computing devices) to allow the third party computing system 140 to facilitate, for example, opening of new accounts with the provider (such as a financial institution) with which the provider computing system 120 is associated. In some implementations, the third party computing system 140 may use such interface elements as one or more SDKs and/or one or more account-open APIs acquired via the financial institution computing system 120. In some embodiments, the third party computing system 140 uses one or more SDKs acquired via the financial institution computing system 120 and no APIs, uses one or more APIs (e.g., account-open APIs) acquired via the financial institution computing system 120 and no SDKs, or a combination of one or more SDKs and APIs (e.g., account open APIs) acquired via the financial institution computing system 120. The interface elements may include, in various implementations, code (provided by, e.g., the financial institution) that is executed at least in part at the third party computing device 140 to implement certain functionality (e.g., account-open functionality) via the electronic platform or operating environment of the third party (e.g., the third party website or third party application running on the user computing device 110). In some implementations, the interface elements may provide for one or more service calls by the third party computing system 140 to the provider computing system 120 to allow the third party computing system 140 to implement certain functionality (e.g., account-open functionality) via the electronic platform or operating environment of the third party (e.g., the third party website or third party application running on the user computing device 110).

In other arrangements, the client application 114 allows users to purchase goods or services from the service provider via the third party computing system 140. In such cases, the user is the recipient of the goods or services, rather than the provider of the goods or services. Consequently, the user may wish to use a new credit card, loan, bank account, etc., to make payments for the goods or services. The user may, for example, use the client application 114 to select items to be purchased, and when it is time to make a payment, the client application 114 may similarly offer the user the opportunity to open a new account with a financial institution for arranging payment. The third party computing system 140 may then communicate with a financial institution computing system 120 (via network 150) to open the account and receive the associated account data needed by the third party computing system 140 to make funds transfers out of the new account. The new account setup can occur as a back-end process that does not require directing the user to a website or application of the financial institution. In some implementations, the third party computing system 140 may use one or more SDKs and account-open APIs acquired via the financial institution computing system 120.

Figure 2:
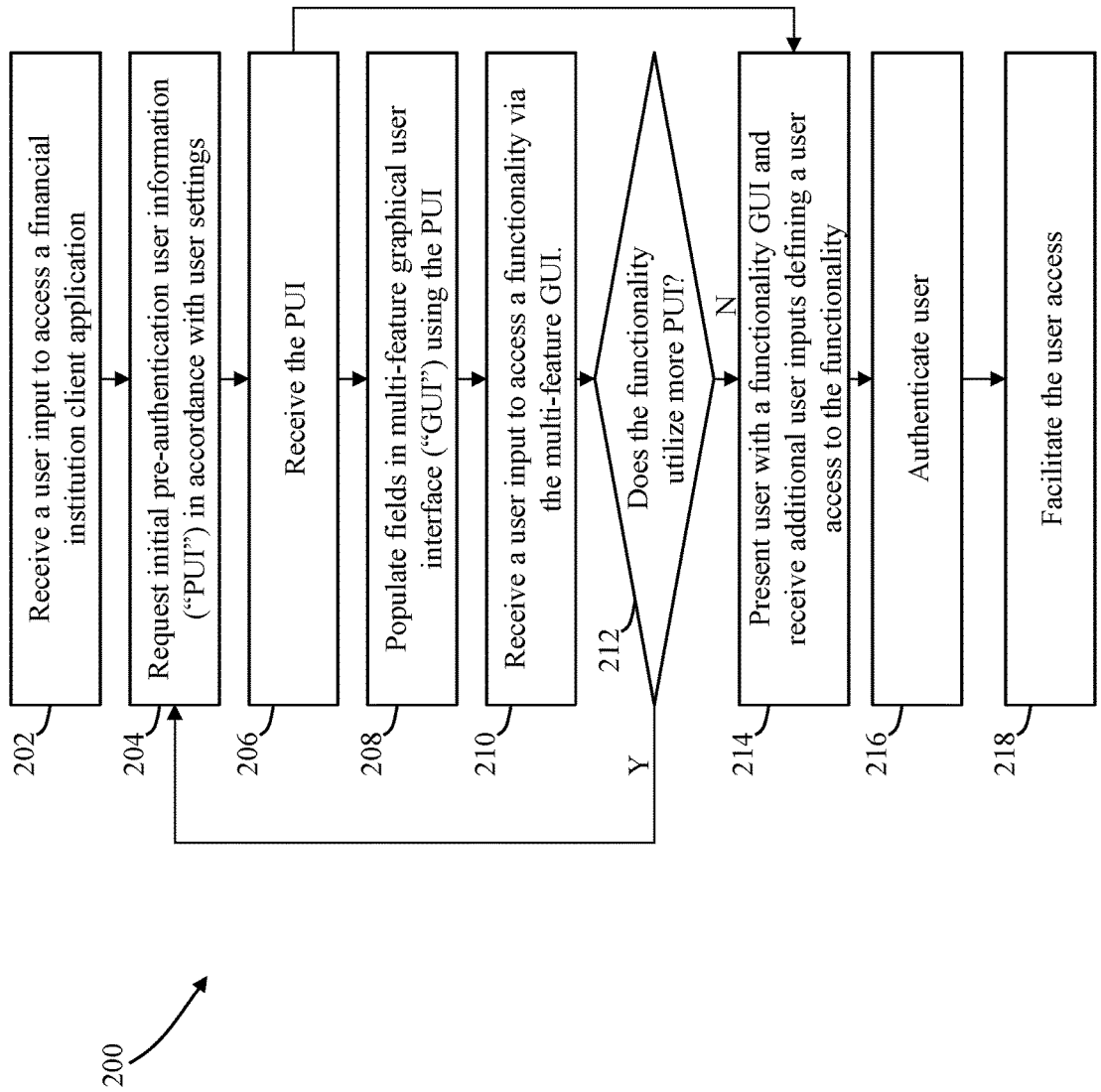
FIG. 2 is a flow diagram of a method of managing a multi-feature graphical user interface including pre-authentication user information, according to an example embodiment.

Referring now to FIG. 2, a flow diagram of a method 200 of managing a multi-feature GUI including pre-authentication user information is shown, according to an example embodiment. Method 200 may be performed by the components described with respect to FIG. 1 such that reference may be made to the components contained therein to aid in the description of the method 200. Method 200 may be performed by, for example, the user device 110 (e.g., via a processor thereof) to update or otherwise manage a multi-feature GUI presented to the user via the client application 112.

At process 202, a user input to access the client application 112 is received. In an example where the user device 110 is a smartphone, the user may select an icon (or other selectable element) via a display device of the smartphone to provide such an input. This input may serve as a command to an operating system of the smartphone causing the smartphone to initialize or otherwise open the client application 112.

At process 204, the user device 110 requests initial PUI in accordance with user settings. In various embodiments, the user (e.g., upon registration or installation of the client application 112) may indicate a preference to have a set of information viewable prior to a time when the client application 112 authenticates the user. In other words, the user may opt to have information viewable pre-authentication that otherwise may only be viewable post-authentication. In some embodiments, the set of information that is viewable prior to authentication is the same for all users of the client application 112 (i.e., the PUI requested is fixed across all users). In alternative embodiments, user may designate certain forms of information as PUI and indicate preferences to maintain other forms of information as only being viewable post-authentication. For example, one user may indicate a preference to have both a listing (e.g., including portions of actual account numbers or account names provided by the user) of the user's accounts at the financial institution as well as the balances of those accounts as PUI. Another user may wish to only an account listing as PUI (i.e., and not the balance information) as PUI.

Accordingly, the client application 112 may cause the user device 110 to formulate information requests in accordance with the user's PUI preferences. In some embodiments, all or a portion of the PUI is requested from the financial institution computing system 120. For example, the user device 110 may transmit an information request for user account information to the financial institution computing system 120 in response to the user input to access the client application 112 received at process 202. In response, the financial institution computing system 120 may cross-reference the requested PUI with user account settings (e.g., stored in the accounts database 124) and, if the requested information is in accordance with the settings, transmit the requested information to the user device 110 at process 206.

At process 208, the user device 110 populates fields (or other information-containing elements) in a multi-feature GUI utilizing the PUI received at process 206. As described herein, the client application 112 includes a presentation tier configured to present the user with an arrangement of manipulable elements. Via interacting with such manipulable elements, the user may provide inputs to access or otherwise utilize a plurality of services typically only accessible through separate applications or websites. In some embodiments, such manipulable elements include elements containing PUI. For example, in one embodiment, the multi-feature GUI includes an account portion containing a listing of user accounts as well as account balance information. Accordingly, the information received at process 206 may be used to formulate elements of the multi-feature GUI presented to the user.

FIG. 3A shows an example multi-feature GUI 300. In an example embodiment, the multi-feature GUI 300 is a home screen for the client application 112 presented to the user prior to the user being authenticated. In other words, other than providing the input to access the client application 112 at process 202, no other actions of the user are necessary to view of the multi-feature GUI 300. As shown, the multi-feature GUI 300 includes an account information portion 302 and a functionality access portion 304. The account information 302 portion may include a listing of the user's accounts at the financial institution and balance information associated with the listed accounts (e.g., depending on the user's PUI settings). As shown, the account information portion 302 includes a single user account. The user may scroll through the listing of accounts by, for example, pressing a display of the user device 110 and dragging in a predetermined direction (e.g., to the left). The initial account shown in the account information portion 302 may be pre-selected. For example, in one embodiment, the initial account is the user's default account in the user's mobile wallet (e.g., provided by the mobile wallet computing system 130 and/or the financial institution computing system 120).

In the example shown, the account information portion 302 includes a mobile wallet payment button 306. The mobile wallet payment button 306 is configured to receive a user input to engage in a mobile wallet transaction utilizing the account shown in the account information portion 302. As such, upon a user pressing the mobile wallet payment button 306, a payment instruction identifying the selected account may be executed by the user device 110 (e.g., via a processor thereof) to formulate an information packet to be transmitted to, for example, a POS device via NFC upon a communication being received from a POS device. For example, the client application 112 may include an integration package associated with a mobile wallet provided or facilitated via the mobile wallet computing system 130 including a function library represented at least in part by the mobile wallet payment button 306 to enable the user to make payments via the client application 112. In some implementations, the mobile wallet payment button 306 only appears if the user has provisioned the account depicted in the account information portion 302 to the user's mobile wallet. Accordingly, upon configuring the multi-function GUI 300, the user device 110 may query the mobile wallet computing system 130 to identify which accounts that the user has provisioned to the user's mobile wallet, and only incorporate the mobile wallet payment button 306 into the account information portion 302 for the provisioned accounts.

The functionality access portion 304 includes a plurality of access points (e.g., buttons, hyperlinks, manipulable elements, etc.) to a broad array of financial services. As used herein, the term "access point" refers to an element configured to receive an input to provide an input to a function being executed by a computing device. In the example shown, the functionality access portion 304 includes a first access point configured to receive a user input to transfer money between the accounts listed in the account information portion 302. Another access point is configured to receive a user input to perform a P2P transfer using a P2P payment system associated with or otherwise accessible via the client application 112. In various embodiments, upon the user interacting with one of the access points in the functionality access portion 304, the user is brought to additional GUIs configured to present and receive additional inputs to provide the depicted service to the user. Examples of such interfaces with respect to the second access point are described with respect to FIGS. 3B-3C herein.

Another access point in the functionality access portion 304 is configured to receive a user preference to deposit a check in the account shown in the account information portion 302 (e.g., by taking a picture of a check or manually entering information of a physical check). Another access point is configured to receive a user input to engage in a card-free ATM transaction. For example, the user may provide such an input when proximate to an ATM to transmit credentials (e.g., a tokenized account number or the like) to the ATM via NFC communication. Upon receipt of the credentials, the user may authenticate herself at the ATM and then utilize functions offered via the ATM. Another access point in the functionality access portion 304 is configured to receive a user input to pay bills. For example, upon providing a bill payment input via the functionality access portion 304, the user may be brought to additional GUIs containing information regarding upcoming bill payments owed by the user (e.g., received by the financial institution computing system 120 as a result of the user linking an account at a service provider with a user account at the financial institution).

Another access point of the functionality access portion 304 is configured to receive a user preference to engage in a mobile wallet transaction (e.g., via the mobile wallet provided by the mobile wallet computing system 130). As such, the multi-function GUI 300 includes multiple access points to the user's mobile wallet: a first in the account information portion 302 and a second in the functionality access portion 304. The first (the mobile wallet payment button 306) may be configured to receive a particularized user input (i.e., an input to engage in a transaction utilizing the account depicted in the account information portion 302). The second (contained in the functionality access portion 304) may be configured to receive a more general user input. For example, upon the user interacting with the mobile wallet access point within the functionality access portion 304, the user may be brought to an additional GUI listing accounts provisioned to the user's mobile wallet and enable the user to manage the mobile wallet. This way, the user is provided with efficient access to different aspect's or features of the mobile wallet.

In some embodiments, the user device 110 is configured to dynamically update the multi-feature GUI 300 based on the use of the functionalities accessible therefrom. For example, if the user does not interact with an interaction point contained in the functionality access portion 304 within a predetermined period, the access point may be removed from the multi-feature GUI. This way, only those features that are actually used by the user are shown, thus further enhancing efficiency by de-cluttering the multi-feature GUI 300.

Referring back to FIG. 2, a user input to access a functionality via the multi-feature GUI 300 is received at process 210. For example, the user may press a screen of the user device 110 in a location corresponding to one of the access points in the functionality access portion 304, thereby calling a function associated with the depicted access point. At process 212, the user device 110 determines if the functionality accessed via the input received at process 210 utilizes additional PUI. If so, additional PUI is requested based on the requested functionality and processes 204 and 206 are substantially repeated to receive PUI used to populate additional user interfaces associated with the accessed functionality.

Once all information for the accessed functionality is obtained, the user is presented with a functionality GUI and additional user inputs are received at process 214. For example, based on the input received at process 210, the presentation tier of the client application 112 may present the user with an additional GUI containing features associated with the accessed functionality.

FIG. 3B shows an example functionality GUI 308. In an example embodiment, the functionality GUI 308 is presented to the user upon the user interacting with an access point depicting a P2P payment system associated with or otherwise affiliated with the financial institution. As shown, the functionality GUI 308 includes a send button 310 and a request button 312 enabling the user to send or request funds via the P2P payment system. In an example, the user is presented with an additional functionality GUI upon the user pressing either the send or request buttons 310 and 312. The additional functionality GUI may include a list of contacts of the user (e.g., obtained from a user phone director or social media network) enabling the user to select an intended recipient or payee for a payment.

Figure 3D:
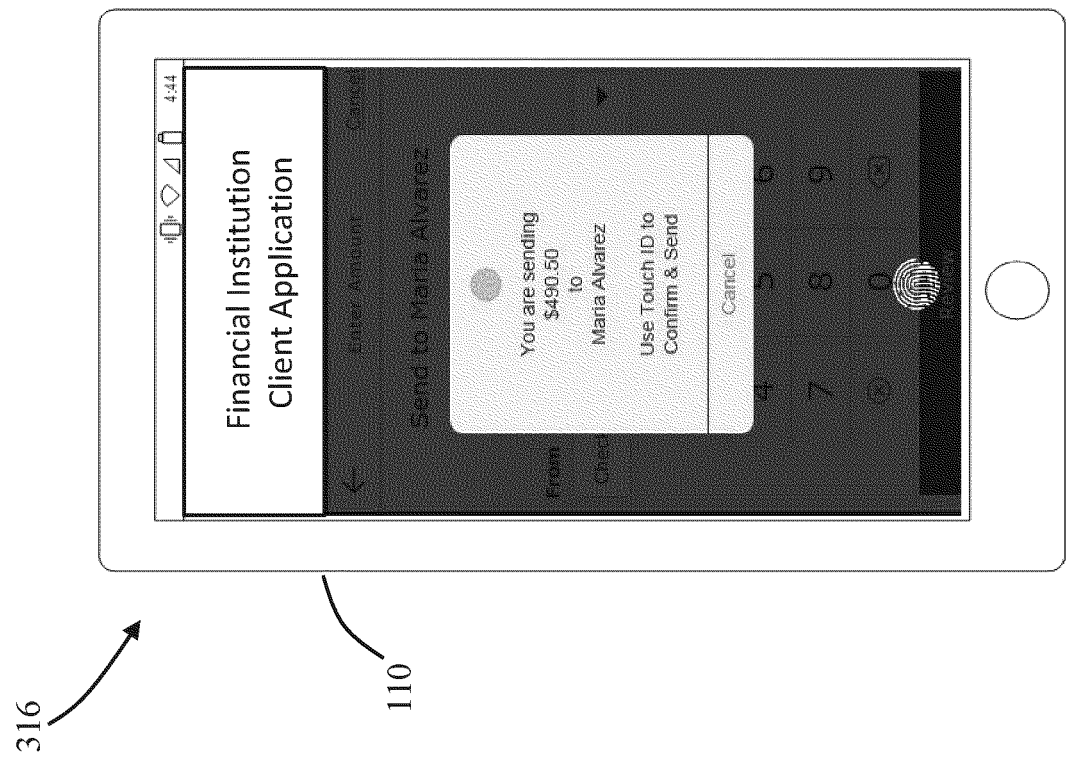
Figure 3C:
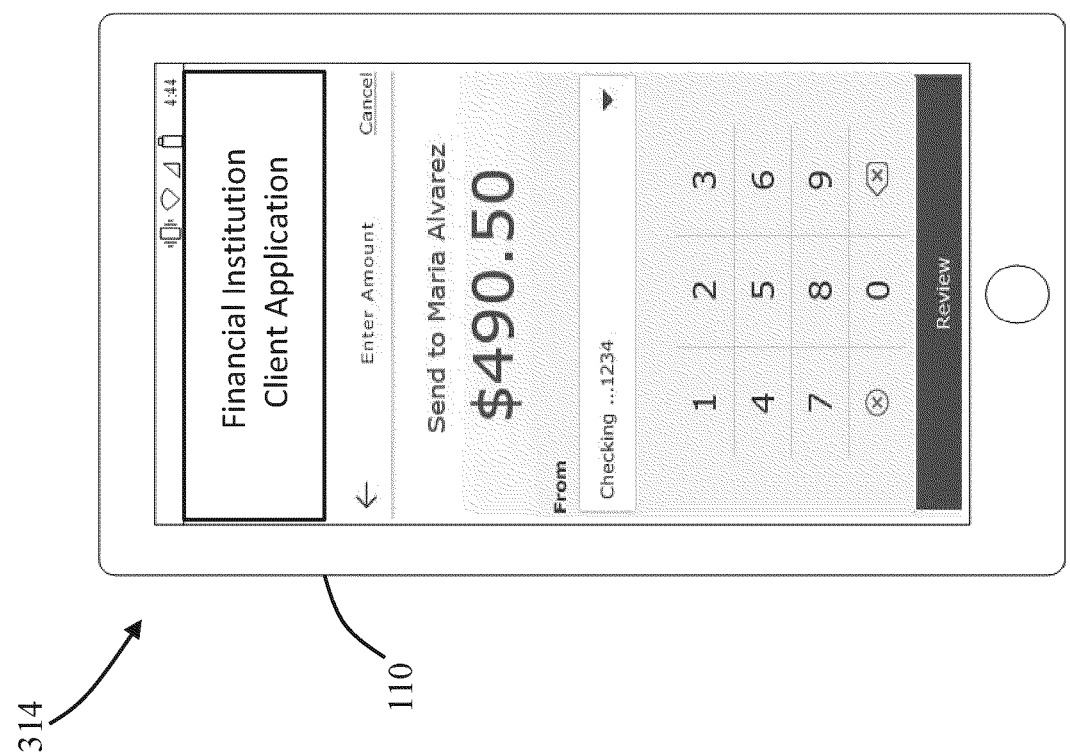

FIG. 3C shows an additional functionality GUI 314, which may be presented to the user upon the user selecting an intended recipient for a payment. As shown, the additional functionality GUI 314 includes a keypad or other input mechanism that enables the user to enter an amount for the payment and an account selection portion. The account selection portion may include a listing of the user's accounts at the financial institution, thus enabling a user to specify an account from which funds are to be transferred to the identified recipient. It should be noted that the user has not yet been authenticated by the client application 112 prior to viewing the additional functionality GUI 314. As such, any information contained on any of the GUIs presented to the user (e.g., the account listings, the contact list, etc.) is PUI. Accordingly, as the user advances through the GUIs presented to define parameters of the P2P payment, the user device 110 may request and receive PUI (e.g., from the financial institution computing system 120 or third party computing system 140 providing the P2P system) to populate such interfaces.

Referring back to FIG. 2, after the additional user inputs are received, the user is authenticated at 216. For example client application credentials (e.g., a login information) may be collected from the user from an authentication GUI. FIG. 3D shows an example authentication GUI 316 instructing the user to place a finger on a fingerprint scanner of the user device 110 to provide the client application credentials. In alternative embodiments, other forms of credentials (e.g., a username and password) are used. The received credentials may be compared with verified credentials (e.g., stored in a memory of the user device 110 or at the financial institution computing system 120) to authenticate the user. In some embodiments, the process used to authenticate the user depends on the input received at process 210. In other words, the particular functionality accessed may require different authentication processes. For example, in certain embodiments, the user is authenticated via a user-input personal identification number (PIN) that is compared to a stored PIN for a first set of functionalities (e.g., balance viewing, settings management, etc.). In this example, the user may be authenticated by both a fingerprint and a PIN for a second set of functionalities (e.g., a mobile wallet transaction, a P2P transfer, etc.). In certain embodiments, the user can designate a level of authentication required to finalize a user's access to a particular functionality (e.g., via a registration process or a settings page presented via the client application 112). For example, the user may select a set of authentication parameters required to access each functionality accessible via the client application 112.

At process 218, the user access to the functionality is facilitated. For example, upon the user being authenticated, the information received from functionality GUIs presented to the user pre or post-authentication may be transmitted to an external computing system. For example, information regarding a P2P payment may be provided to the P2P payment system to facilitate the processing of the P2P payment. In another example, a payment application may be enabled to transmit credentials associated with a selected account to facilitate the user engaging in a mobile wallet transaction. By facilitating the presentation of the PUI to the user, the user is able to efficiently discern whether they actually desire to access the functionality. For example, if the user determines that an account balance is too low prior to engaging in a transaction (e.g., via the P2P system or the mobile wallet), the user may end the method 200 to avoid the hassle of authentication.

Figure 4:
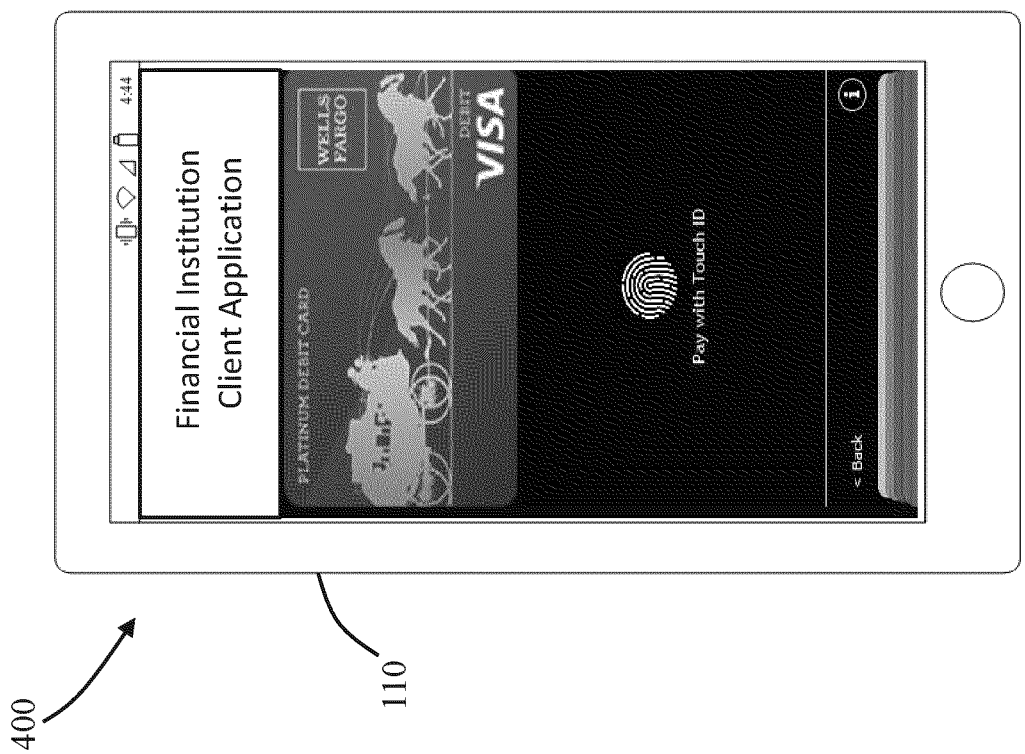
FIG. 4 is an example authentication graphical user interface, according to an example embodiment.

FIG. 4 shows another example authentication GUI 400 that may be presented to the user after the user, for example, provides an input to engage in a mobile wallet transaction via the functionality access portion 304 of the multi-feature GUI 300 described with respect to FIG. 3A. As shown, the authentication GUI 400 includes a depiction of a selected card or account and an account selection portion enabling the user to update the selected account to utilize in a forthcoming mobile wallet transaction prior to providing authentication credentials. Thus, the user is provided with maximum flexibility regarding the transaction prior to authentication taking place.

Figure 5:
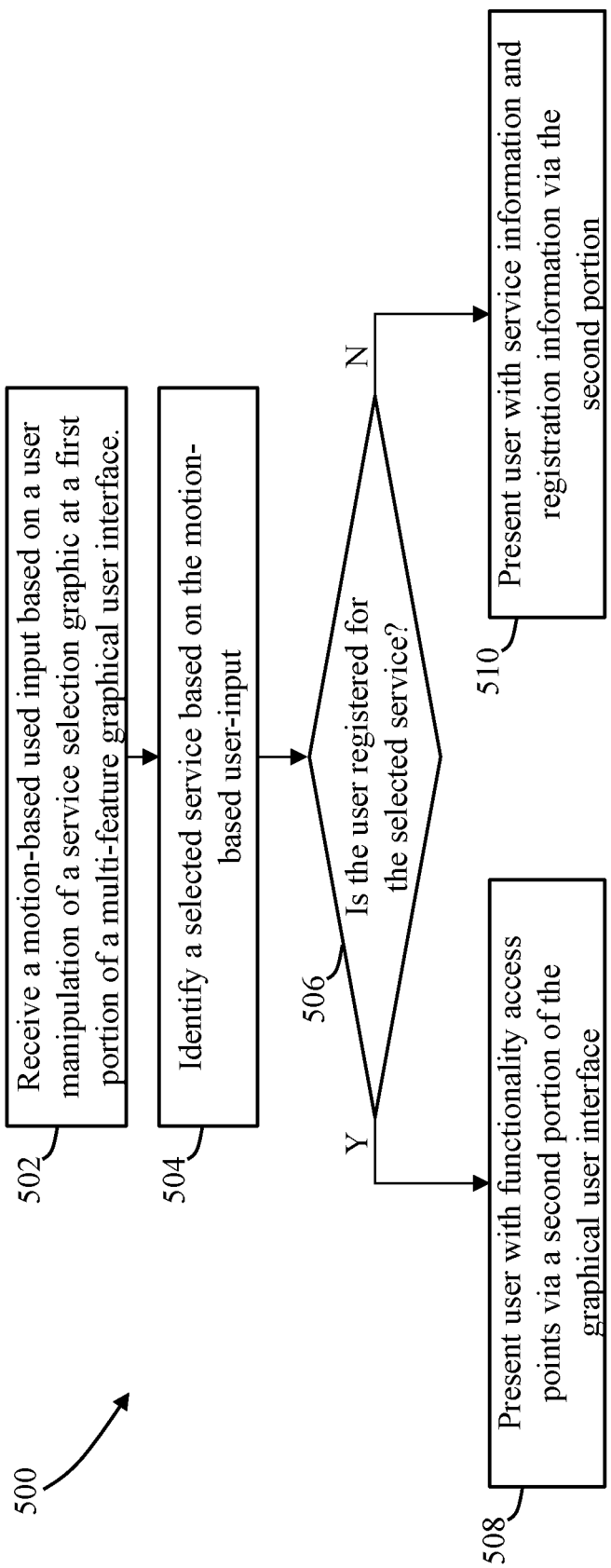
FIG. 5 is a flow diagram of a method of managing a multi-feature graphical user interface, according to an example embodiment.

Referring now to FIG. 5, a flow diagram of a method 500 of managing an alternative multi-feature GUI is shown, according to an example embodiment. For example, in some embodiments, the multi-feature GUI presented to the user via the client application 112 differs in from the multi-feature GUI 300 described herein with respect to FIG. 3A. The user device 110 may execute the method 500 to manage or otherwise update the alternative multi-feature GUI.

Figure 6B:
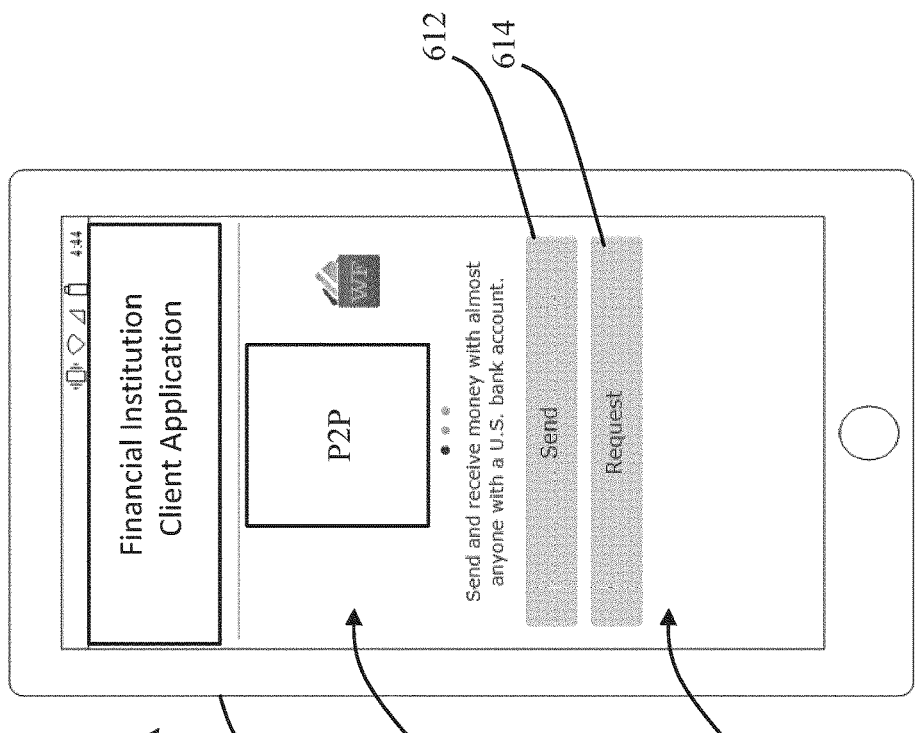
FIGS. 6A-6B are example graphical user interfaces presented to the user during performance of the method described in FIG. 5, according to an example embodiment.
Figure 6A:
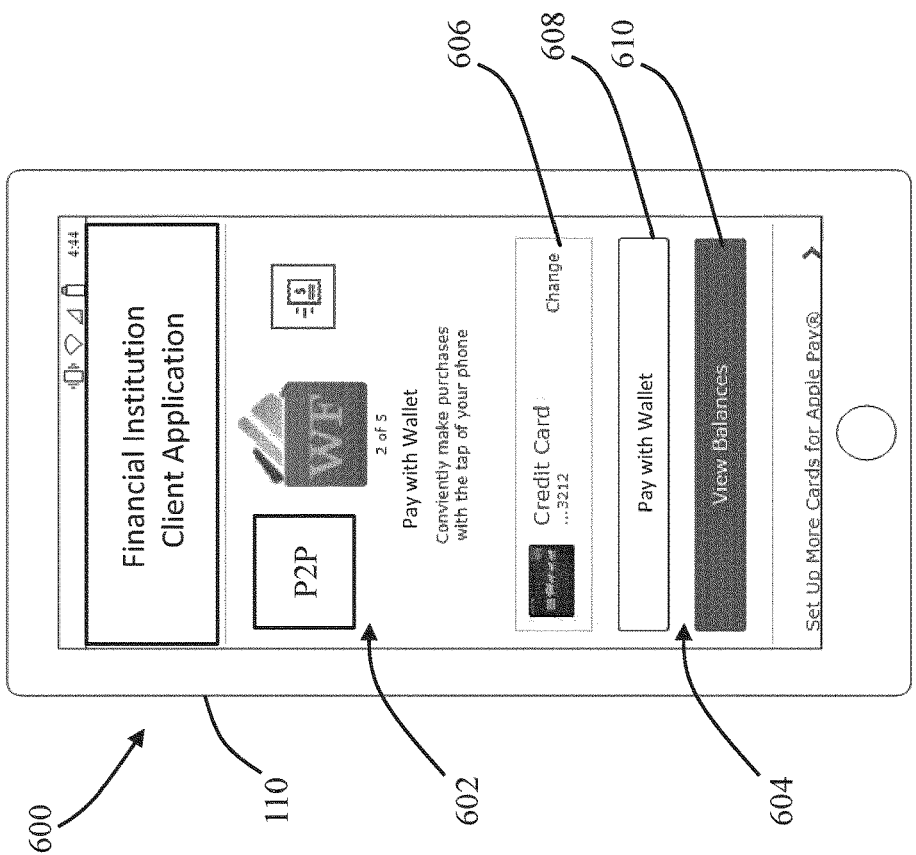

At process 502 a motion-based user input based on a user manipulation of a service selection graphic at a first portion of a multi-feature GUI is received. For example, a user may scroll through a series of services accessible via the client application 112 to select one of the services. FIG. 6A shows an example multi-feature GUI 600 presented via the presentation tier of the client application 112. The method 500 may be executed to update the multi-feature GUI 600. As shown, the multi-feature GUI 600 includes a functionality carousel 602 and a functionality access portion 604. The functionality carousel 602 includes a plurality of depictions of various services accessible via the client application 112. The services depicted may correspond to those described with respect to the functionality access portion 304 of the multi-feature user interface 300 described with respect to FIG. 3A. In some embodiments, the functionality carousel 602 also includes depictions of user accounts. In some embodiments, the order in which the services appear in the functionality carousel 602 is customizable by the user. Alternatively or additionally, the user device 110 may update the order in which services appear based on the utilization of the services (e.g., services or accounts used most commonly may appear first). The user may select a depicted service by scrolling through the functionality carousel 602 to provide the motion-based user input.

At process 504, the user device 110 identifies a selected service based on the motion-based user input. Referring to FIG. 6A, the identification may be made based on the service depicted at a central location of the functionality carousel 602. At process 506, the user device 110 determines whether the user is registered for the selected service. In some embodiments or situations (e.g., when the selected service does not require registration), process 508 is omitted. For example, if a user selects a depiction of an account of the user via the functionality carousel 602, process 508 may be omitted, and the functionality access portion 604 may automatically update to include information (e.g., balance information, transaction history, etc.) pertaining to the selected account.

If the user is registered for the selected service, the user device 110 updates the functionality access portion 604 to include functionality access points at process 508. FIG. 6A shows an example where the user selects a mobile wallet and the user has already registered for the mobile wallet (e.g., the user has provisioned accounts to a mobile wallet account). As shown in FIG. 6A, the functionality access portion 604 contains an account selection box 606 enabling the user to select one of the accounts to utilize in a mobile wallet transaction, a payment button 608 configured to receive a user input to engage in a mobile wallet transaction, and a balance viewing button 610 enabling the user to view a balance of an account via the account selection box 608.

As will be appreciated, the functionality access portion 604 will differ in appearance depending on the service selected via the functionality carousel 602. For example, FIG. 6B shows an example where a user selects a P2P service via the functionality carousel 602. As shown, the functionality access portion 604 includes send and request buttons similar to those described with respect to FIG. 3B. Other services (e.g., bill payment, wire transfers, card-free ATM, etc.) may include different access points to enable the user to set parameters with respect to an access of the selected functionality. As will be appreciated, the access points contained in the functionality access portion 604 may be also include PUI, so, in a manner like that described with respect to FIG. 2, the user device 110 may request PUI from any systems to populate the functionality access portion 604 in response to the user selecting a service via the functionality carousel 602.

If however, the user has not registered for the selected service, the user device 110 presents the user with information regarding the selected service at process 510. For example, the functionality access portion 604 may include information regarding the selected service and a registration button configured to receive a user input to set up an account (if necessary) to utilize the selected service. If the user selects the registration button, the user may be presented with a plurality of additional GUIs to gather any necessary information from the user. In various embodiments, the financial institution may update the services depicted in the functionality carousel 602 through transmitting information updates to the user device. Thus, the multi-feature GUI 600 enables the user to efficiently access and gain information regarding a broad array of services.

Figure 7:
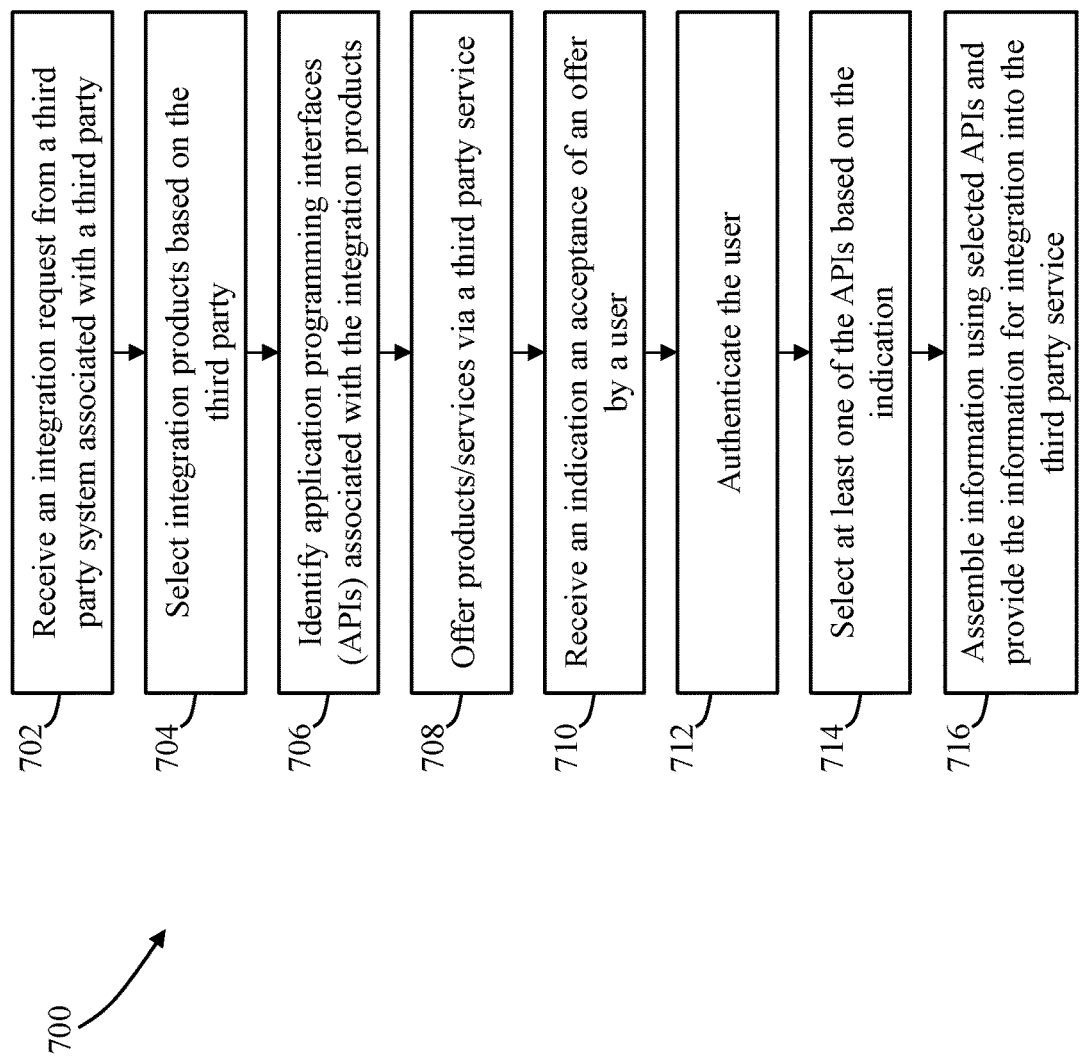
FIG. 7 is a flow diagram of a method of enabling access to a service via a third party, in accordance with an example embodiment.

Referring now to FIG. 7, a flow diagram of a method 700 of enabling access to a service via a third party is shown, according to an example embodiment. Method 700 may be executed by, for example, the third party integration circuit 128 of the financial institution computing system 120 to provide access to a functionality or other service via a third party service.

As described herein, the financial institution computing system 120 includes a library of APIs, the API bank, to facilitate the communication of information relating to an assortment of products or services offered by the financial institution to third parties. For example the API bank may include a first set of APIs to facilitate the sharing of customer financial information (e.g., account balance information, transaction histories, etc.) with third parties (e.g., to facilitate aggregators providing financial health services to users). Other APIs may related to payments (e.g., mobile wallet, P2P, etc.). Still other APIs may be configured to provide information relating to other products provided via the financial institution (e.g., lines of credit, mortgages, tax services, etc.). In this regard, the API bank includes a specific API or group of APIs for each product offered by the financial institution that third parties may integrate into various third party client applications 114. The financial institution may render select portions of the API bank accessible to third party computing systems 140 to enable such products or services to be accessed from within a third party website or mobile applications. The financial institution computing system 120 may also include additional software integration components to facilitate such integration with third party services. For example, financial institution may agree to provide a third party with an associated SDK to facilitate the integration of software constructed by the financial institution into an application provided via the third party. Method 700 may be executed to enable such integration to allow a user to access an integrated service.

At process 702, an integration request is received from a third party computing system 140 associated with a third party. For example, the financial institution and third party may form a partnership to render the financial institution's service's accessible via an application or website of the third party. In accordance with this partnership, the third party (e.g., via an associated third party computing system 140) may request access to software integration components (e.g., an SDK, a pre-developed applet, etc.) stored or otherwise provided via the financial institution computing system 120. In some implementations or situations, the third party may provide the financial institution with such software integration components to enable the financial institution to advertise products and/or services within the third party service. In such embodiments, the financial institution may update the content viewable via the third party services (e.g., to advertise different products and or services via the third party).

Alternatively or additionally, in certain implementations, no agreement or partnership is formed between the financial institution and the third party. For example, the financial institution may implement a registration program (e.g., a web-page, application, or the like) through which third parties may request to integrate financial institution products into their services. The third parties may provide a request to the financial institution computing system 120 by providing an input (e.g., by selecting an "integrate" icon or the like) via the registration program. In the request, the third party may be required to provide various forms of information, such as the third party's primary service to customers (e.g., whether a retail shop, whether an aggregator, whether a content provider, etc.).

At process 704, integration products are selected based on the third party. For example, the partnership between the financial institution and third party may specify products or services that are to be integrated into the third party service. In other embodiments, financial institution personnel select products and services to render accessible via the third party services. The products and services may be selected to streamline or enhance the third party service. In a first example, if the third party service relates to business formation and management (e.g., Pro-Tier™), the financial institution services pertaining to incorporation (e.g., retrieval of the necessary documents), account formation, taxes, and financial data sharing may be selected. Another third party service (e.g., associated with an e-commerce merchant) may seek to integrate a mobile wallet payment functionality enabling the user to access a mobile wallet from within the third party service to make payments. Yet another third party service (e.g., associated with a social media platform) may seek to integrate a P2P payments functionality enabling users to access a P2P payments system from within the third party service. Thus, the set of services selected may be specifically tailored to the third party.

In another example, the financial institution computing system 120 may be configured to automatically select a set of products for the third party based on the information contained in a request received from the registration program. For example, based on a type of service provided via the third party, the financial institution may select an assortment of products to render available via the third party services. To illustrate, if the third party is an e-commerce merchant, the financial institution computing system 120 may select a mobile wallet service facilitating users making mobile wallet payments from within a third party service (e.g., a shopping website or application).

At process 706, one or more APIs associated with the integration products are identified. Once partnerships between the financial institution and various third parties have been formed, the financial institution develops or identifies pre-developed APIs necessary to facilitate the information sharing necessary for the selected integration products. The APIs may be selected to create layers of abstraction to facilitate the third parties developing software packages to integrate the selected integration products into the third party services. For example, the APIs may define the manner with which an associated third party computing system 140 or a user device 110 executing a third party application 114 is to request information from the financial institution computing system 120. For example, information requested via the APIs may identify a selected integration product, thereby enabling the financial institution computing system 120 to provide access to the API in real-time in response to receiving such information requests.

The selected APIs may define a command through which information is to be requested via a third party services. The command may include an API-identifier that identifies the API at the financial institution computing system 120. Additionally, the command may include a third party identifier portion such that the third party and particular third party service requesting information from the financial institution computing system 120 be included in any information requests. In some embodiments, this data is integrated into a token or a digital certificate issued by the financial institution. The tokens or digital certificate may be encrypted via an encryption key specific to the third party. This way, third party applications may be written such that, when users request to access the integration products via the third party services, properly formatted commands including the encrypted tokens are transmitted by the user device 110 and/or third party system 140. The information necessary to formulate the command (e.g., the token, the digital certificate, etc.) may be transmitted to the third party system 140 to facilitate the integration of the products into the third party service such that information requests are generated from within the third party service. As such, the financial institution computing system 120 can efficiently determine if the third party has access to the APIs associated with the integration product.

After the APIs are selected based on the selected integration products, access permissions associated with the selected APIs are updated. For example, an API directory may be updated such that commands containing properly-formatted commands (e.g., including a token and/or digital certificate that, when decrypted using an encryption key associated with the third party, matches the assigned token or digital certificate) activate the selected APIs to provide information to the third party service necessary to integrate the financial institution product into the third party service.

At process 708, products or services are offered via a third party service. In some implementations, software components developed by the third party or financial institution are exposed to users within applications accessed via the third party computing system 140. In some embodiments, the exposed software components may comprise applets enabling users to access functionalities provided via the client application 112 described herein. Other software components may be configured to enable the user to register for an account at the financial institution from within the third party service. Other components may contain information and enable users to access other products (e.g., mortgages, lines of credit, etc.) offered by the financial institution. The certain products exposed may be determinable by the financial institution computing system 110. For example, the third party system 140 offering the third party service accessed by a user may transmit information regarding the user to the financial institution computing system 110, which may determine a product to expose based on the user information. Alternatively or additionally, such analysis may be performed via the third party system 140. Thus, different products of the products selected at process 704 may be exposed to different users based on information regarding the user (e.g., the user's purchasing history at the third party).

Figure 8B:
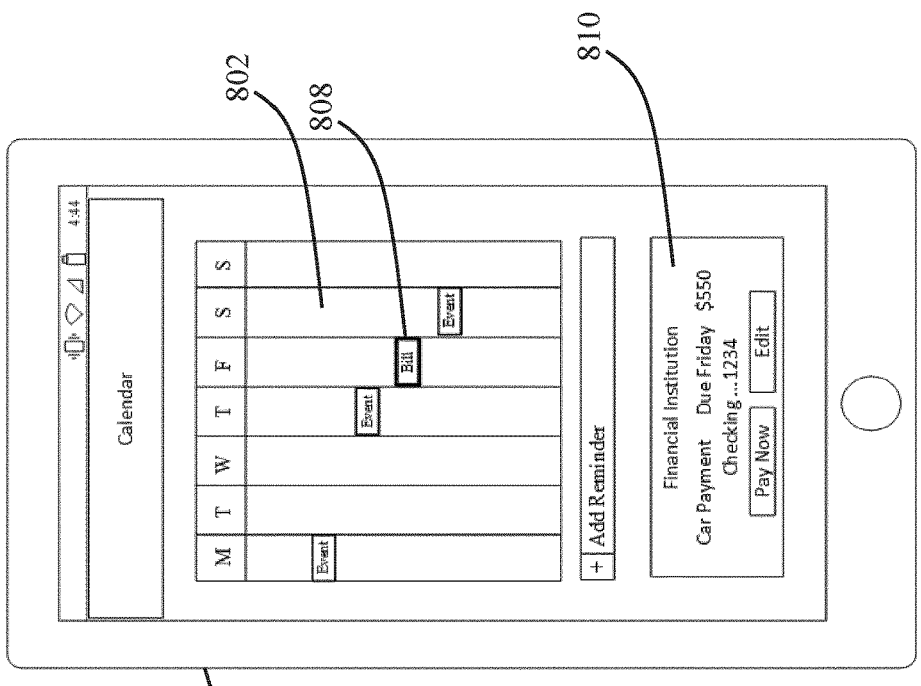
FIGS. 8A-8B are example third party graphical user interfaces, according to an example embodiment.
Figure 8A:
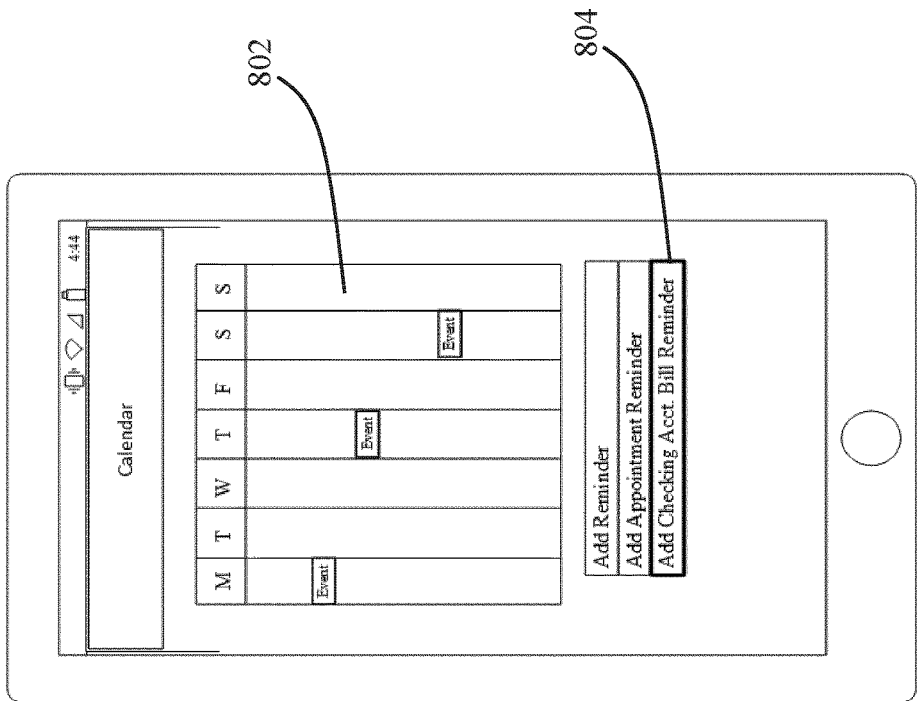

FIG. 8A is an example integration GUI interface 800 including an offering of a financial institution product in a third party service. The example shown involves a third party application 114 enabling the user to set up an event calendar. As shown, the integration GUI 800 includes an event portion 802 containing various events (e.g., entered by the user or retrieved from other data sources such as social media websites) associated with the user. As shown, the integration GUI 800 includes a bill payment reminder button 804 configured to receive a user input to provide the third party application 114 with access to the customer's bill payment information. Put differently, via the bill payment reminder button 804, the user is able to access a financial institution service typically only accessible via an application provided via the financial institution (e.g., the client application 112). For example, the third party client application 114 may include an integration package configured to request customer bill payment information via an associated API if the user provides an input via the bill payment reminder button 804. Other third party applications 114 may integrate other financial institution services suitable for integration therein.

Referring back to FIG. 7, an indication of an acceptance of an offer by a user is received at process 710. In the example shown in FIG. 8A, the user may select the bill payment reminder button 804 to provide the input to integrate bill payment information into the event calendar. In other examples, the user may indicate a preference to accept an offering of a financial institution product presented to the user from within the third party service. In response, the user device 110 (or the third party computing system 140) may communicate the indication of the acceptance to the financial institution computing system 120. The indication of the acceptance may include the command including the encrypted token specified when the APIs were initial selected at process 706.

In various embodiments, the partnership between the financial institution and third party may define information that is to be included in the indication of the acceptance. For example, the financial institution may require that the indication include certain forms of information regarding the user (e.g., name, street address, etc.). The financial institution may also require other forms of information (e.g., the current location of the user obtained via the user device, an authentication credential of the user such as a username or password, etc.). Accordingly, upon the user initially providing an input to utilize a product or service offered by the financial institution, additional GUIs may be presented to the user to collect the information specified prior to this information being relayed to the financial institution computing system 120. Alternatively or additionally, such information may be collected from the third party computing system 140 (e.g., retrieved from the third party accounts database 146) and provided to the financial institution.

At process 712, the user is authenticated. In various embodiments, such authentication is performed based on the information contained in the indication received at process 710. For example, based on the user's name, the financial institution computing system 120 may retrieve information regarding the user stored at the financial institution (e.g., in the accounts database 124) and cross-reference the retrieved information with information contained in the indication to authenticate the user. In another embodiment, the customer's current location (e.g., contained in the indication) may be cross-referenced with a user address contained in the indication. If there is a mismatch between these locations (e.g., by more than a predetermined mileage threshold), the financial institution computing system 120 may request an alternative form of authentication from the user. For example, in response to the user not being authenticated based information contained in the indication, the financial institution computing system 120 may transmit an authentication request to the third party computing system 140. This may cause the third party computing system 140 to transmit an information packet (e.g., an authentication splash page) to the user device 110 requesting authentication credentials (e.g., mobile banking credentials used to authenticate the user's access to the client application 112) from the user. In some embodiments, if the user is not authenticated, method 700 ends.

At process 714, if the user authenticated, at least one API in the API bank is selected based on the indication. For example, based on the identity of the product or service that the user is seeking to access, the financial institution computing system 120 may select an API to provide necessary information to the third party computing system 140 or user device 110. In some embodiments, APIs are selected based on information regarding the user. For example, different APIs may be selected depending on whether the user has been registered to receive a service directly from the financial institution. For example, if the user selects the bill payment reminder button 804 described with respect to FIG. 8A and has not yet registered to pay her bills via the financial institution, a registration API may be enabled to present bill payment registration interfaces to the customer from within the third party application.

In some embodiments, different APIs may be enabled based on a level of confidence in the user's authentication (or in the security of the third party computing system 140). For example, based on a confidence rating of the user's authentication (e.g., determined based on a lookup table assigning confidence scores to amounts of verified information regarding the customer obtained), APIs providing variable amounts of customer information may be selected. For a user having a low confidence rating (e.g., if the user provides a correct address, but has a current location not corresponding to the address), the financial institution computing system 120 may select an API that shares less information than possible. In an example, for a low-confidence user indicating a preference to share bill payments information with a third party service may enable an API including only the dates of upcoming bill payments, rather than the amounts. In some embodiments, upon selection of a particular API, a notification is transmitted to the third party computing system 140 such that the customer experience within a third party application 114 may be updated to incorporate the integrated service.

At process 716, information is assembled using the selected APIs and provided to the third party computing system 140 or user device 110 for integration into the third party service. In some embodiments, upon selecting the APIs, the financial institution computing system 120 updates information access permissions associated with a user account in the accounts database 124 to facilitate periodic information sharing via the third party application 114 to integrate a service into the third party application 114. In the example described with respect to FIG. 8A, user bill payment information may be shared upon requests being received via the third party application 114. In another example, user mobile wallet information (e.g., provisioned accounts, tokens, etc.) may also be shared with another third party client application 114 to enable the customer to initiate mobile wallet transactions from within the third party client application 114. For example, the user may make payments for rides received via a driving service application via the user's mobile wallet.

In some situations, the financial institution computing system 120 formulates an information request for the selected APIs based on the information contained in the indication received at process 710. For example, if the selected service is an incorporation assistance service offered by the financial institution, the selected APIs may be used to retrieve versions of the selected documents and provide them to the third party computing system 140 and/or user device 110 for presentation to the user. In some embodiments, where multiple APIs are selected, an aggregator may assemble the information rather than the financial institution computing system 120. For example, if the integration product is a mortgage offered by the financial institution, an aggregator may utilize the selected APIs to assemble tax information, account balance information, credit report information, and the like to aid in determining the user's eligibility for the mortgage.

In some embodiments, transactions are performed after the APIs are used to collect necessary information to integrate the product or service. For example, if the product selected by the customer is to register for an account at the financial institution, additional information may be requested from the user (e.g., source account information such as a picture of a check, an account number, a tokenized account number from a mobile wallet, etc.). The additional information may be used to formulate a transaction request to fund the user's new account.

FIG. 8B shows an example integration GUI 806 having a financial institution service integrated therein. The integration GUI 806 is an extension of the example described with respect to FIG. 8A (e.g., after the user has been authenticated and the bill payment information has been provided to the third party application 114). As shown, the event portion 802 has been updated to incorporate a user bill payment reminder 808. For example, the integration package contained within the third party client application 114 may be configured to construct such reminders from bill payment information received from the financial institution computing system 120. This way, the user is able to efficiently view upcoming bill payments. The integration GUI 806 also includes a payment window 810. In addition to enabling the user to view the bill payment information via the calendar, the integration package of the third party client application 114 may include a payments applet overlaid by the payment window 810. To facilitate such a payments applet, in this example, the financial institution computing system 120 may enable both a bill payment information API as well as a payments API for the third party client application 114 during the method 700. Thus, depending on functionalities desired by the third party, differing amounts of APIs may be enabled.

Figure 9:
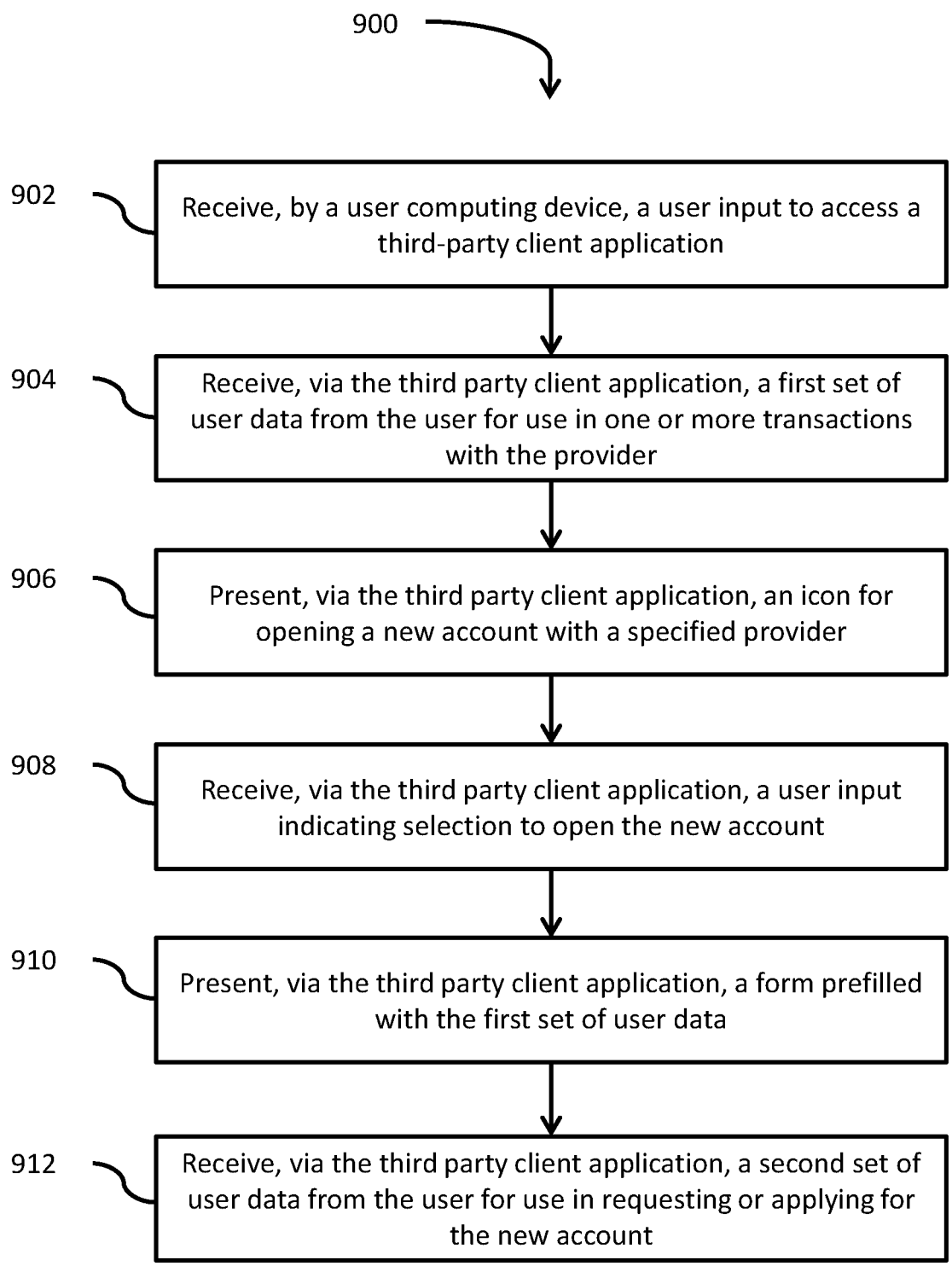
FIG. 9 is a flow diagram of a method of a user engaging with a service provider computing system via a client application of the service provider, according to an example embodiment.

Referring now to FIG. 9, a flow diagram of a method 900 of a user engaging a service provider is depicted, according to an example embodiment. Method 900 may be performed by the components described with respect to FIG. 1 such that reference may be made to the components contained therein to aid in the description of the method 900. Method 900 may be performed by, for example, the user computing device 110 (e.g., via a processor thereof) associated with a user, and a third party computing device 140 associated with a service provider. The user may use, in certain implementations, a client application 114 of the service provider running on the user computing device 110. The client application 114 may have been acquired via the third party computing device 140 directly or indirectly via a digital application distribution platform (e.g., Google Play™ or Apple's App Store™).

At process 902, a user computing device 110 receives a user input to access a client application 114 of the service provider. In an example where the user computing device 110 is a smartphone, the user may select an icon (or other selectable element) via a display device of the smartphone to provide such an input. This input may serve as a command to an operating system of the smartphone causing the smartphone to initialize or otherwise launch or open the client application 114. If the user is accessing the service provider's website, the input may be for launching a browser and entering the website address for the service provider.

At process 904, the user inputs, via the service provider client application 114, a first set of user data for use in one or more transactions with the service provider. This may be part of a setup/registration process, in which the user creates a user account to be used by the user in providing goods or services to customers of the service provider, or to be used by the user for purchasing goods or services from the service provider. The first set of user data may include biographical information, such as the user's name and address. If the user is offering goods or services via the client application 114, the first set of user data may include information related to the goods or services being offered.

At process 906, the service provider client application 114 presents an icon for opening a new (financial) account with a specified financial institution. Such an icon may, in some examples, state "Sign me up," "Open a new account," or the like. The client application 114 may indicate which financial institution, and provide information on the new account or incentives for opening the identified account with the financial institution.

At process 908, the client application 114 of the service provider may receive a user input indicating that the user has selected to open a new account with the financial institution. The user input may, in some examples, include selection of the icon on the display screen of the user computing device 110 that is running the client application 114. In some implementations, touching the screen at the location of the icon (or otherwise selecting to open the new account via other mechanisms, such as via a voice command by stating, e.g., "open new account" or other suitable instruction) may cause the user computing device 110 (or the operating system thereof) to generate a signal indicating that the screen has been touched or that the user input has been received, informing the client application 114 that the user has chosen to proceed with opening the new account.

At process 910, the service provider client application 114 may present a form with information that is to be provided to the financial institution computing device 120 for opening the new account. What information is requested may be determined, at least in part, by the financial institution and/or by the type of account being opened. The form may include one or more question fields, each with one or more data fields for answers to the corresponding questions. The information needed to open the new account may overlap with the information acquired by the client application 114 for transactions between the user and the service provider. That is, some or all of the first set of user data may be data that the financial institution also requests or requires for use in opening the new account. Because the client application 114 already has access to the information, and to save the user from having to enter the same information again, the client application may "prefill" one or of the data fields of the form by inserting answers into the data fields corresponding with the questions for which answers have already been entered. In some embodiments, the user is requested to edit the prefilled data fields to update or change the prefilled information if appropriate, and to confirm that the prefilled data is accurate.

In some implementations, the financial institution may require more information for opening the new account than is required by the service provider for engaging in transactions with the user. That is, the user may not have already entered or otherwise provided all the information requested or required by the financial institution for opening the new account as part of the user account setup/registration process with the service provider. For example, the bank may require information on the user's citizenship status, or may require the user's social security number or other information, while the service provider may not request or require such information. In such cases, the client application may request additional information, such as by including additional question fields (with no prefilled data in corresponding data fields) in the form to allow the user to provide additional answers. At process 912, the user inputs, via the client application 114 running on the user computing device 110, a second set of user data with additional information for use in requesting or applying for the new account.

In some implementations, the second set of user data remains confidential or is otherwise not shared with or kept by (e.g., saved in non-volatile storage) the service provider. This may be accomplished in various ways. For example, in certain examples, the second set of user data may be transmitted to the financial institution computing system 120 via the user computing device 110. This may be accomplished by, for example, client application 114, without directing the user to a website or application of the financial institution for submitting the second set of user data. In such cases, the first set of user data may be transmitted to the financial institution computing system 120 by the third party computing system 140 (or, in some versions, also by the user computing device 110), but the second set of user data is transmitted to the financial institution computing system 120 by the user computing device 110.

In some implementations, the user computing device 110 may be provided with a unique code to validate the transmission to the financial institution computing device 120 or to otherwise identify the service provider and/or user account with which the new financial account will be associated. In some versions, the third party computing device 140 may generate a number in a format designated by or known to the financial institution computing device 120. The code may include, for example, a first portion uniquely identifying the financial institution, a second portion uniquely identifying the service provider, a third portion uniquely identifying the type of account, a fourth portion indicating when the code was generated and/or should be deemed expired (e.g., 10 minutes from time of code generation) if the code is to have an expiration after which a new code may be required, and so forth. The user computing device 110 may transmit the second set of user data as well as the code to the financial institution computing device 120. The financial institution computing system 120 may then use the code as validation of the second set of user data, and/or as an indication of how to use the second set of user data.

In certain implementations, the second set of user data may also be transmitted to the financial institution computing device 120 by the third party computing system 140 of the service provider, but the second set of user data may be encoded before it is transmitted to the third party computing device 140. The second set of user data may be encoded by, for example, the user computing device 110 (using, e.g., client application 114). The third party computing device 140 may, in various examples, be incapable of decoding the second set of user data (or the service provider may otherwise voluntarily not decode the data so that the information therein is not revealed to the third party computing system 140 or otherwise available to the service provider). In certain other implementations, the second set of user data is not encoded, but the third party computing device 140 simply passes on the second set of user data without storing it, such that it is not later available to the service provider.

Figure 10:
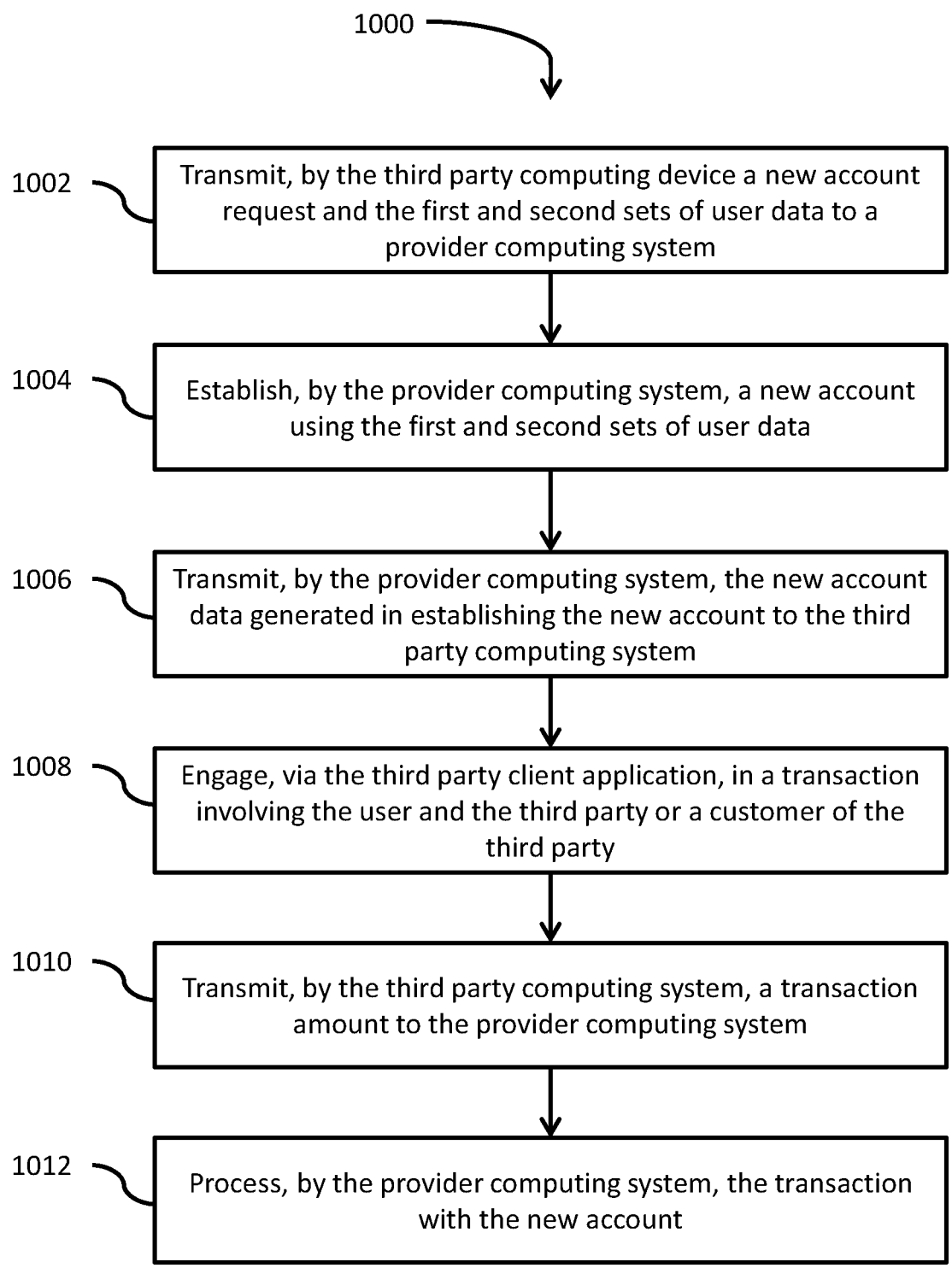
FIG. 10 is a flow diagram of a method for requesting and opening a new account with a financial institution via a client application of a third-party service provider, according to an example embodiment.

Referring to FIG. 10, a flow diagram of a method 1000 for opening and using a new account is depicted, according to an example embodiment. Method 1000 may be performed by the components described with respect to FIG. 1 such that reference may be made to the components contained therein to aid in the description of the method 1000. As with method 900, method 1000 may be performed by, for example, the user computing device 110 (e.g., via a processor thereof) associated with a user, and a third party computing device 140 associated with a service provider. The user may use, in certain implementations, the same client application 114 of the service provider running on the user computing device 110.

At 1002, the third party computing device 140 of the service provider may transmit the first set of user data (and potentially the second set of user data, in encoded form or otherwise) to the financial institution computing system 120 via one or more account-open interface elements (e.g., APIs), which may have been obtained via the financial institution computing device 120. In some implementations, the act of the third party computing system 140 transmitting the user data to the financial institution computing system 120 via the interface elements may itself serve as a request to open the new account. In other implementations, the third party computing device 140 may transmit a separate request for opening the new account to be associated with the first and second sets of user data. In various examples, the request to open the new account may identify the type of account to be opened (e.g., credit, loan, checking, etc.) and/or any associated incentives (e.g., a bonus as reward for choosing to open the new account with the financial institution).

In other examples, the request may also indicate that the financial institution computing device 120 will separately receive the second set of user data (and potentially the first set of user data) from a user computing device 110. In such a case, the request may identify the source of the data (such as by internet protocol (IP) address of the user computing device 110) or other data identifying or otherwise associated with the user computing device 110. In some implementations, the financial institution computing device 120 may validate the second set of user data with the code received from the user computing device 110 and/or with the identification of the source of data by the third party computing device 140.

At process 1004, the financial institution computing system 120 may establish the new account using the first set of user data and, if any, the second set of user data. This may involve, in part, generating account data for the new account, such as a unique account number. The account data identifies the new account, and would be used for transfers into the new account, charges to the new account, transfers out of the new account, etc. At process 1006, the financial institution computing system 120 transmits the new account data to the third party computing device 140 of the service provider. In some implementations, the third party computing system 140 may use the account data, or the account data may be capable of being used, to engage in a transaction with the user as soon as the new account data is received from the financial institution computing system 120.

At process 1008, the user (via client application 114 running on the user computing device 110) engages in a transaction with the service provider (via the third party computing device 140). This may include, for example, the user providing goods or services to a customer of the service provider (e.g., performing a gig), or purchasing goods or services from the service provider (e.g., via online shopping). As a result of the transaction, the user may owe a certain amount of money, or may be owed a certain amount of money. At 1010, the third party computing system 140 of the service provider may transmit the transaction amount to the financial institution computing system 120. At 1012, the financial institution computing device 120 may process a transaction using the new account based on the transaction amount. This may involve, for example, the financial institution computing device 120 issuing a charge or credit to a credit card of the user, making a deposit into a checking or savings account of the user, and so forth. Processing the transaction may also involve the financial institution computing device 120 making a corresponding transfer into or out of a financial account of the service provider of the transaction amount (with adjustments for fees, if any). Advantageously, the deposit of funds into the user's account may happen more quickly via such an arrangement. For example, the service provider has a closer relationship with the financial institution, and as a result, can process deposits into user accounts more quickly (e.g., instantly when the user completes a task/gig). In some implementations, funds may be credited to user accounts and made available to users without conventional delays, even if the funds transfer from the customer's account (which may be held at another financial institution) to the account of the service provider may otherwise take relatively more time to complete.

Figure 11:
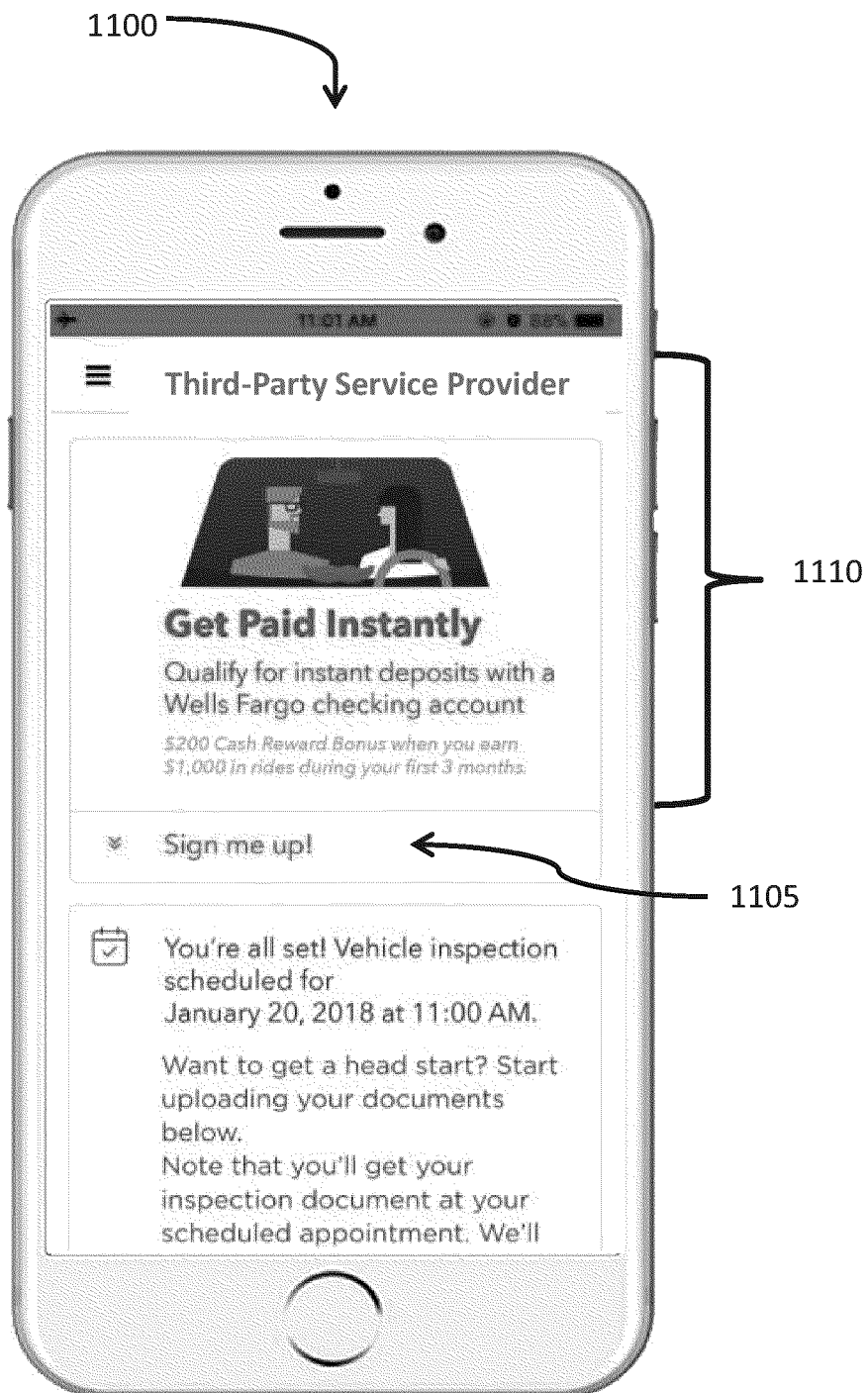
FIG. 11 is an example graphical user interface as part of a user registration with a service provider via a client application of the service provider, according to an example embodiment.

FIG. 11 shows an example GUI 1100 associated with a first screen for a user setup/registration process between a user and a service provider (e.g., the process of a user registering to perform gigs via the service provider's platform). In the example embodiment depicted, the service provider is the transportation company Lyft™ and the user computing device 110 is a smartphone. The GUI 1100 depicts an example screen that may be displayed by the service provider's client application 114 running on the user computing device 110. Once the user has begun (or completed) the setup/registration process, the user may be provided with icon 1105 (here, an opportunity to indicate a desire to open a new account by touching "Sign me up!" on the screen). As depicted, the client application 114 allows the user to "Get Paid Instantly" for goods or services provided by the user to customers of the service provider by qualifying for instant deposits with a new checking account at a specified financial institution (along with an incentive for opening the specified new account).

The GUI 1100 in FIG. 11 shows a first set of visually perceptible elements 1110 on the display screen of the user computing device 110. The elements 1110 include a logo, an image showing a vehicle with a driver and a passenger corresponding with the services offered via the service provider, and a text style (e.g., font, size, color, line spacing, indentation, etc.). Elements 1110, which are selected by, provided by, or otherwise associated with the service provider, may help identify and brand the service provider. The user computing device 110 presents the offer for opening the new account from within the client application 114 of the service provider.

Figure 12:
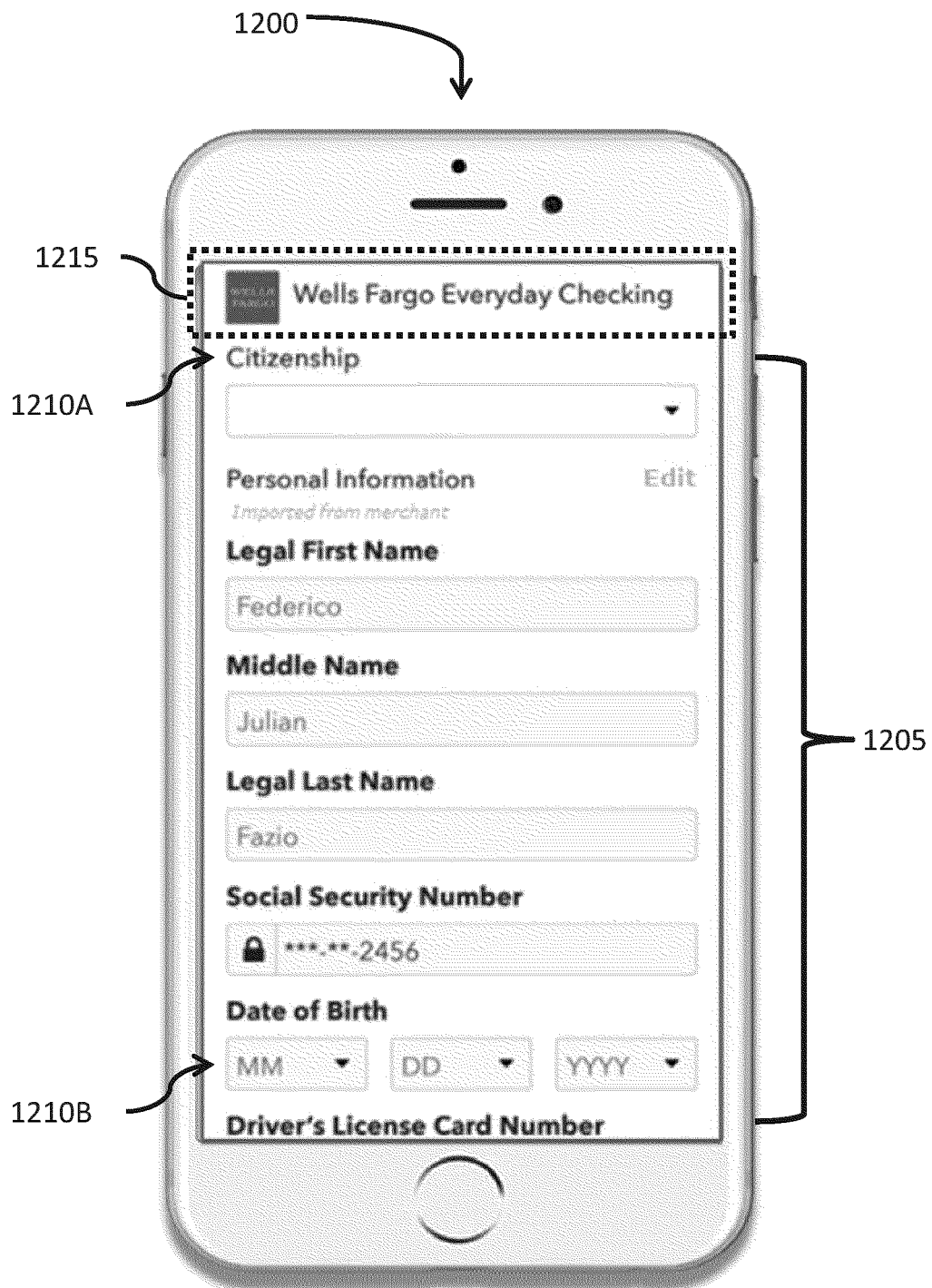
FIG. 12 is an example graphical user interface of a third-party service provider client application as part of a request or application for a new account with a financial institution, according to an example embodiment.

FIG. 12 shows an example GUI 1200 associated with setting up the new account to be held at the financial institution in the name of the user. In the example embodiment shown, a second screen is used by client application 114 to acquire/confirm the information to be transmitted to the financial institution computing system 120 for use in establishing the new account. GUI 1200 presents a form 1205 with a set of question fields (e.g., Legal Firm Name, Middle Name, etc.) and a set of data fields (the rectangular boxes below the question fields). At least some of the information requested by the question fields may have been provided to client application 114 as part of the user registration process (e.g., when the user was creating a user account for use in performing gigs on behalf of the service provider) and may be included in the first set of user data. Such data (e.g., Federico, Julian, etc.) has been prefilled into the form (i.e., inserted into the data fields associated with corresponding question fields). Form 1205 also includes two question fields that request information that was not part of the first set of user data (i.e., Citizenship 1210A and Date of Birth 1210B). These data were not required or otherwise not previously requested by the client application 114 for the purpose of establishing the user account or otherwise registering the user with the service provider.

The GUI 1200 includes a second set of visually perceptible elements 1215 on the display screen of the user computing device 110. The elements 1215 include a logo, the name of the financial institution establishing the new account, an identification of the account to be requested/opened (here, "Everyday Checking"), and a text style (e.g., font, size, color, character spacing, etc.). Elements 1215, which may be selected by, provided by, or otherwise associated with the financial institution, may help identify and brand the financial institution. The user computing device 110 presents the visually perceptible elements 1215 associated with the financial institution from within the client application 114 of the service provider.

Although not shown, the first screen can be scrolled to allow the user to view additional information (e.g., the data field associated with the "Driver's License Card Number" question field). The client application 114 may provide the user with a "Submit" or "Apply" icon to allow the user to submit the request/application for the new account. In some implementations, the icon may be provided after the form (i.e., after the last data field for the last question field). The user input of touching the icon (or other suitable user input, such as a voice command) may cause the user computing device 110 to generate a signal that is provided to the client application 114 to indicate that the user wishes to proceed with setting up the new account. As a result, the third party computing device 140 (and/or the user computing device 110) may transmit, via the account-open interface elements, the first and second user data to the financial institution computing device 120 so that the new account can be opened (e.g., based on the user being approved for the new account by the financial institution computing device 120).

The new account request/application process is implemented from within the client application 114 of the service provider, without directing the user to a website or application of the financial institution (such as by, e.g., having the user computing device 110 launch a browser and access a website of the financial institution, or by having the user computing device 110 launch a client application 112 that is associated with the financial institution). Advantageously, eliminating this requirement to divert the user to a different website or application saves time and effort for the user, and reduces demand for computing time and resources. Additionally, keeping the user within the operating environment of the service provider (e.g., client application 114 of the service provider) allows the service provider to maintain some control over the user experience (by, e.g., selecting what perceptible elements are presented, what selectable options are provided, what information is exchanged, etc.).

Further, by making it easier for customers to easily set up new accounts for financial transactions with the service provider, the customer may begin performing gigs sooner than they otherwise would be able to, without the distraction, delay, and inconvenience of separately setting up the new account (e.g., by navigating to a third party website to set up an account, waiting for account approval, returning to the service provider application/website to enter in their new account details, and double checking that the new account details the user entered are indeed correct). This also reduces the likelihood that the customer will not return to the service provider after being diverted to a financial institution website or client application 112 for a non-integrated process of setting up a new account, and having to make an effort to return to the service provider client application 114, sign in, and provide the new account data or otherwise link the new financial account to the user account so that the new account can be used for subsequent transactions with the service provider. This is also advantageous for the financial institution because making it easier for customers to arrange for financial transactions through new accounts at the financial institution (even if not already a customer of the financial institution), incentivizes service providers to partner with the financial institution, thereby establishing more accounts at and bringing more customers to the financial institution.

Figure 13:
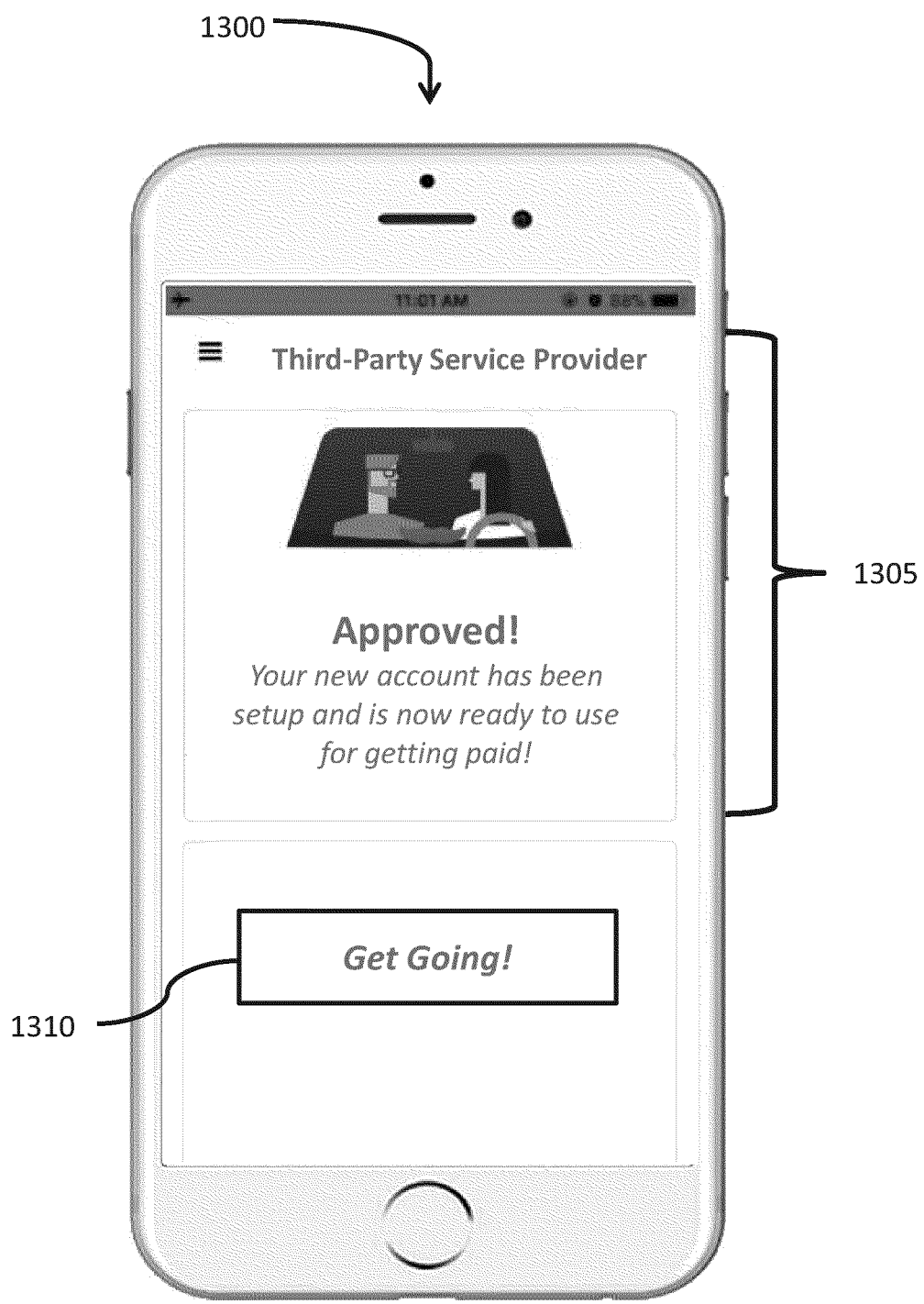
FIG. 13 is an example graphical user interface presented by a client application of a third party service provider following a decision regarding whether the new account has been approved by a financial institution, according to an example embodiment.

FIG. 13 shows an example GUI 1300 following a decision from the financial institution computing device 120 to approve the account. In some implementations, the approval and the newly-generated account data has been transmitted by the financial institution computing device 120 to the third party computing device 140, and the new account data can be used for subsequent transactions between the service provider and the user. In the example embodiment of a third screen depicted in FIG. 13, the user has completed the process of opening the new account, and the first set of visually perceptible elements 1305 associated with the service provider is displayed (e.g., the logo, image, and text style associated with or used by the service provider, etc.). The client application 114 may present a selectable icon 1310 to allow the user to indicate that he or she would like to proceed and provide goods or services to customers of the service provider. In response to selection of icon 1310, the client application 114 may, for example, begin the process of matching the user with suitable customers who may wish to receive goods or services from the user.

The API bank described herein facilitates providing customizable levels of integration with respect to various third party services, thus providing third parties with maximal flexibility in terms of the depth of services they wish to incorporate. Additionally, the API bank arrangement enhances flexibility for the financial institution in forming service integration partnerships. Because the financial institution computing system 120 selectively enables differing APIs in real-time, for example, the financial institution is able to update the APIs to, for example, update information sources or the like.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by a service provider computing system associated with a service provider, the method comprising:
   transmitting, to an institution computing system of an institution, via a telecommunications network, a request for integration of account open functionality in a website or application of the service provider;
   receiving identifiers of one or more application programming interfaces (APIs) responsive to the request for integration and responsive to access permissions being set to permit access to the APIs by the service provider computing system, identifiers of the one or more APIs, wherein each of the one or more APIs invokes a respective command of the institution computing system, at least one command including the account open functionality;
   providing, to a user device, the website or application comprising the APIs that invoke commands of the institution computing system;
   receiving, via the website or application of the service provider, a set of user data from a user computing device of a user, wherein the set of user data is transmitted by the user computing device to the service provider computing system in response to a signal, received at the user computing device via the website or application of the service provider, indicating the user has selected to open a new account with the institution, wherein the set of user data is encoded by the user computing device such that it cannot be decoded by the service provider computing system;
   transmitting, via the telecommunications network, using at least one API that invokes the account open functionality of the institution computing system, an account open request and the set of user data to the institution computing system of the institution; and
   receiving a set of account data for use in a transaction with the user computing device, the set of account data having been generated by the institution computing system in opening the new account, wherein the new account is opened without the website or application of the service provider directing the user to the website or application of the institution.

2. The method of claim 1, further comprising transmitting the account open request to the institution computing system via an application programming interface (API).

3. The method of claim 1, further comprising receiving the set of account data via a first API of the one or more APIs.

4. The method of claim 1, further comprising receiving, via the website or application of the service provider, one or more selections of items to be purchased by the user, wherein the transaction comprises charging the items to the new account.

5. The method of claim 1, further comprising presenting, via the website or application of the service provider, information on a task to be performed for a customer of the service provider, wherein the transaction comprises a deposit into the new account for performing the task.

* * * * *